United States Patent
Takano

(10) Patent No.: US 9,578,611 B2
(45) Date of Patent: Feb. 21, 2017

(54) RADIO COMMUNICATION DEVICE, RADIO COMMUNICATION METHOD, AND RADIO COMMUNICATION SYSTEM

(75) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 253 days.

(21) Appl. No.: 14/125,499

(22) PCT Filed: Jun. 12, 2012

(86) PCT No.: PCT/JP2012/065016
§ 371 (c)(1),
(2), (4) Date: Dec. 11, 2013

(87) PCT Pub. No.: WO2013/021723
PCT Pub. Date: Feb. 14, 2013

(65) Prior Publication Data
US 2014/0119349 A1    May 1, 2014

(30) Foreign Application Priority Data
Aug. 10, 2011    (JP) .................................. 2011-175335

(51) Int. Cl.
H04B 7/212    (2006.01)
H04W 56/00    (2009.01)
H04W 16/32    (2009.01)
H04W 72/04    (2009.01)

(52) U.S. Cl.
CPC ............ *H04W 56/001* (2013.01); *H04W 16/32* (2013.01); *H04W 72/0406* (2013.01)

(58) Field of Classification Search
CPC ........... H04W 36/0066; H04W 56/001; H04W 74/0891; H04L 7/0008; H04L 2012/5674
See application file for complete search history.

(56) References Cited

U.S. PATENT DOCUMENTS

| 2010/0008317 A1 | 1/2010 | Bhattad et al. |
| 2012/0250641 A1* | 10/2012 | Sartori ................. H04W 48/12 370/329 |
| 2014/0056244 A1* | 2/2014 | Frenne ................. H04L 5/0078 370/329 |

FOREIGN PATENT DOCUMENTS

| JP | 2011-077964 A | 4/2011 |
| JP | 2011-527877 A | 11/2011 |
| WO | 2008/157692 A | 12/2008 |
| WO | 2010/006289 A2 | 1/2010 |

OTHER PUBLICATIONS

Qualcomm Incorporated, Techniques to help optimizing the CRE gains, 3GPP TSG-RAN WG1#63, R1-106383, Nov. 9, 2010.

(Continued)

*Primary Examiner* — Alvin Zhu
(74) *Attorney, Agent, or Firm* — Chip Law Group

(57) ABSTRACT

The invention operates as a base station and preferably suppresses interference between cells in a downlink to a terminal in a range expansion area, under a radio communication environment in which cells in different sizes are layered. PDCCH parts which are respectively used by a Macro eNodeB and a Pico eNodeB are separated by a search space so that all information in the PDCCH can be protected from losing due to interference. Since a user equipment can maintain a control signal in the PDSCH part, a signal in the PDSCH can be output from an eNodeB and this improves the throughput.

10 Claims, 30 Drawing Sheets

(56) References Cited

OTHER PUBLICATIONS

Kyocera, Interference Management for Control Channels in Outdoor Hotzone Scenario, 3GPP TSG-RAN WG1#61 R1-102678, May 4, 2010.
Fujitsu, Inter-cell CSI-RS interference coordination for common channels in HetNet, 3GPp TSG-RAN WG1#63b R1-110468, Jan. 31, 2011.
Japanese Office Action issued on Mar. 10, 2015 in patent application No. 2011175335.
International Search Report issued Jul. 10, 2012 in PCT/JP2012/065016.
Huawei, "Enhanced ICIC for control channels to support HetNet", 3GPP TSG-RAN WG1#61 Meeting #61 R1-103126, http://www.3gpp.org/ftp/tsg_ran/WG1_RL1/TSGR1_61/Docs/R1-103126.zip>, May 10-14, 2010, pp. 6, Montreal, Canada.
Motorola, "Downlink Control Protection in LTE TDD for non-CA Heterogeneous Networks", 3GPP TSG-RAN WG1#61b R1-103924 http://www.3gpp.org/ftp/tsg_ran/WG1_RL1/TSGR1_61b/Docs/R1-103924.zip>, Jun. 28-Jul. 22, 2010, pp. 6, Dresden, Germany.
Japanese Office Action issued on Jul. 28, 2015 in patent application No. 2011175335.

\* cited by examiner

FIG. 2
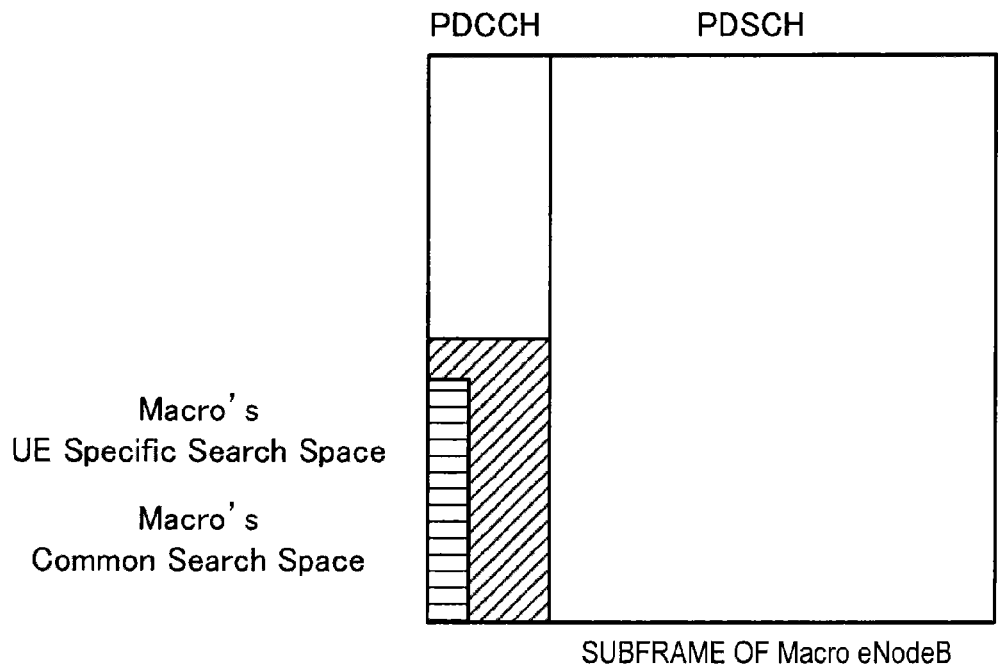
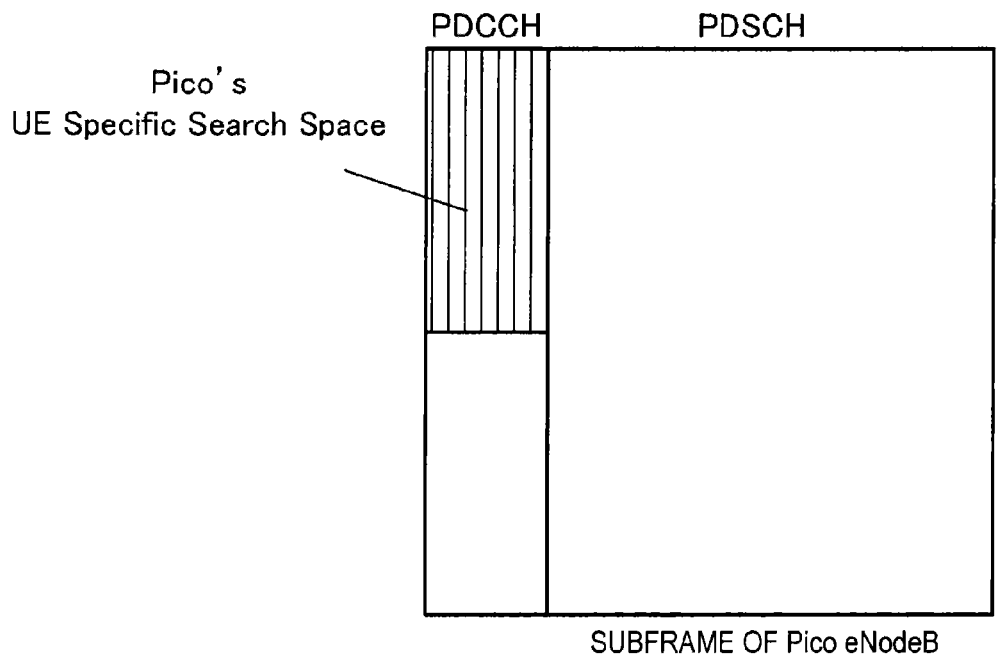

FIG. 3
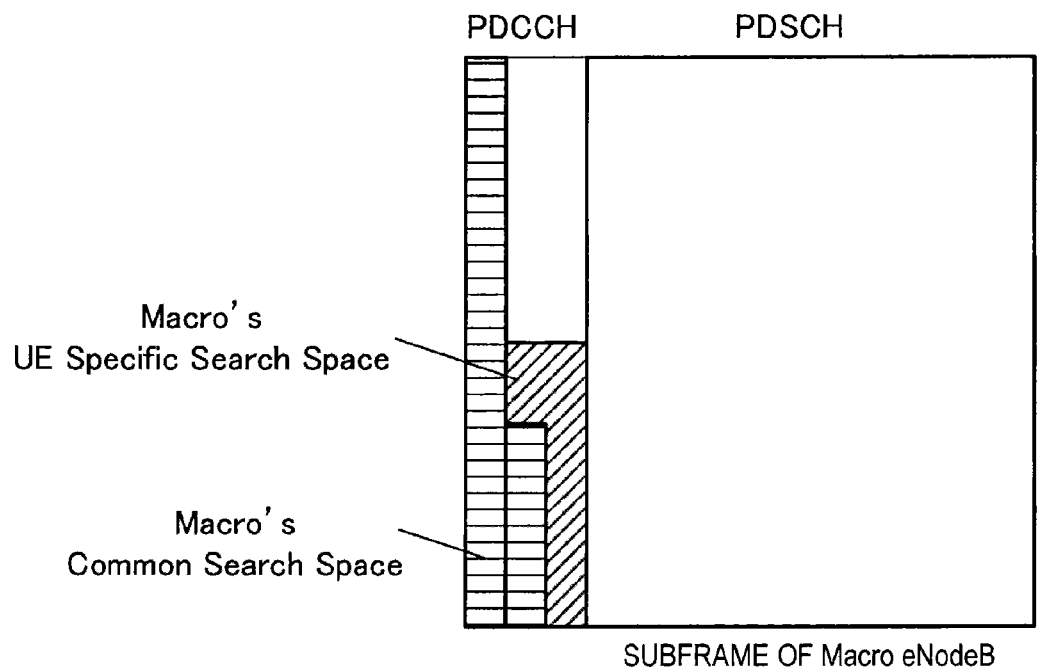
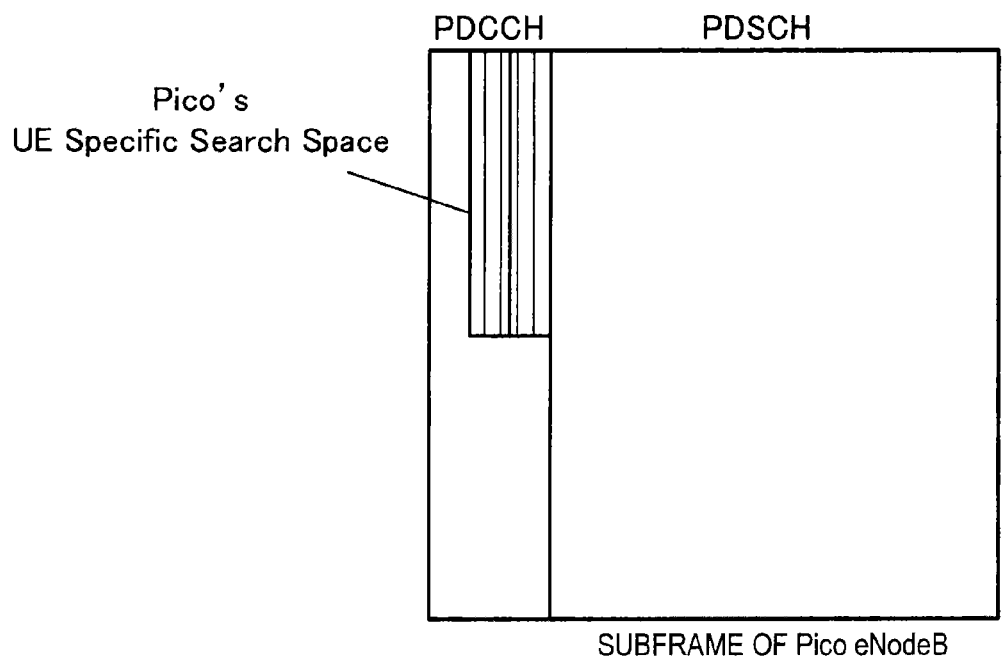

SUBFRAME #0

72 SUBCARRIERS

1 SUBFRAME

RADIO COMMUNICATION DEVICE, RADIO COMMUNICATION METHOD, AND RADIO COMMUNICATION SYSTEM

TECHNICAL FIELD

A technique disclosed in this specification relates to a radio communication device, a radio communication method, and a radio communication system, which function as a base station in a radio communication environment in which cells in different sizes are layered, more particularly, a radio communication device, a radio communication method, and a radio communication system, which restrict interference between cells in a radio communication environment in which cells in different sizes are layered.

BACKGROUND ART

Recently, in 3GPP (Third Generation Partnership Project), "IMT (International Mobile Telecommunications)-2000," which is the world standard of the third generation (3G) mobile communication system designed by ITU (International Telecommunication Union), has been standardized. "LTE (Long Term Evolution)," which is one of data communication specifications designed by 3GPP, is a long-term advanced system aiming at IMT-Advanced of the fourth generation (4G) and also referred to as "3.9G (Super 3G)." LTE is a communication method based on an OFDM modulation method and OFDMA is used as a downlink radio access method.

In LTE, two duplex communication methods of FDD (Frequency Division Duplex) and TDD (Time Division Duplex) can be selected. In FDD, an uplink coverage area and a downlink coverage area are used. A radio frame format composed of consecutive 10 subframes is used in the uplink and the downlink, respectively. Here, the uplink is communication from a terminal station (UE terminal: User Equipment) to an LTE base station (eNodeB: evolved Node B), and the downlink is communication from the eNodeB to the user equipment. Also in TDD, a radio frame format composed of consecutive 10 subframes is used. In TDD, however, uplink and downlink communications are performed in the same band. Each subframe constituting the radio frame is composed of control signal PDCCH (Phy Downlink Control Channel) from eNodeB and PDSCH (Phy Downlink Shared Channel) used as user data.

Further, LTE performs operation in which a single frequency is commonly used in all cells in a one-cell reuse system. This is because it may cause a shortage of frequency resources when different frequencies are used between adjacent base stations like conventional cellular systems. In this case, there is a problem that radio wave for transmitted and received by user equipment existing near the cell may interfere with each other. Then, in LTE as 3GPP Rel-8, a technique called Inter Cell Interference Coordination (ICIC) of Rel-8 is employed.

ICIC is realized by a fractional frequency reuse in a combination of one-cell frequency reuse and multi-cell frequency reuse, for example. In fractional frequency reuse, each cell can be divided into a center region inside of the cell close to eNodeB and a peripheral region at a cell edge away from eNodeB. A "central frequency" allocated to communication between eNodeB and a user equipment in the center region is competitive with adjacent cells (that is, one-cell frequency reuse); however, interference between cells can be avoided by maintaining transmission power small so that signals can be transmitted only in the center region. On the other hand, although large power is required to transmit signals to the peripheral region, interference between cells can be avoided when different "peripheral frequencies" are used in peripheral regions of the adjacent cells (that is, multi-cell frequency reuse).

FIG. 24 illustrates a manner that three cells 1 to 3 that perform the fractional frequency reuse are adjacent to one another. In the figure, the hexagonal shape represents a single cell coverage. The cells 1 to 3 are divided into center regions illustrated as blank parts inside the cells and peripheral regions illustrated as hatched parts in the periphery of the cells. Although the central frequency allocated to the center regions is competitive with adjacent cells (that is, a single frequency reuse), interference between cells can be avoided by maintaining transmission power small so that signals are transmitted only in the center region. On the other hand, different frequencies are allocated to peripheral regions of the adjacent cells. In FIG. 24, differences of frequency band are represented by hatching types (diagonal hatching lines, vertical hatching lines, and horizontal hatching lines).

Further, in Rel-8 ICIC of 3GPP, in addition to the above described frequency reuse technique, signals for suppressing interference are exchanged between base stations, which are eNodeB, via an X2 interface (The X2 interface is an interference connecting between eNodeBs and an optical fiber is its typical example). As messages exchanged via the X2 interface, concretely, there are a High Interference Indicator (HII) and an Overload Indicator (OI). Here, an HII is information to inform a location of a resource block allocated to the user equipment at cell edges to adjacent eNodeB. From the resource block specified by the HII can be determined to have a high possibility to receive interference. Thus, considering the possibility, scheduling is performed on the resource block in the adjacent cells. On the other hand, OI is information to inform a degree of interference to the uplink resource block and has three levels of low, medium, and high. When it is informed that the degree of interference to a certain resource block is high by OI via the X2 interface, an adjacent eNodeBs adjusts scheduling and an uplink power control regarding the resource block.

In this manner, Rel-8 ICIC has an object to remove interference between macro cells and employs a method to adjust via the X2 interface. However, what is adjusted by this method is only PDSCH in a subframe and PDCCH part cannot be adjusted. This is because PDCCH is a format in which adjacent cells use the same frequency band to resist interference.

Next, Rel-10 ICIC will be explained. Rel-10 ICIC has an object to control interference between a macrocell and a picocell.

In 3GPP, a method called HetNet that improves a capacity of an entire system by layering cells in various sizes such as macro, micro, pico, and femto. Pico eNodeB, which is a base station of a picocell, has a characteristic of having transmission power lower than that of Macro eNodeB as a base station of a macrocell by several dozens dB. It can be assumed that there is an X2 interface between Macro eNodeB and Pico eNodeB (in other words, interference to the PDSCH part in a subframe is already solved by Rel-8 ICIC). Here, it has to be assumed that the X2 interface between Pico eNodeB and Macro eNodeB is an interface having a weaker characteristic in speed, capacity, and delay than the X2 interface between Macro eNodeBs in some cases.

Since the transmission power from Pico eNodeB is low, there are many areas in which signals from Macro eNodeB can be strongly received. Even in an area in which propagation loss from the picocell is smaller than propagation loss from Macro eNodeB (or, even in an area being closer to picocell than Macro eNodeB), when received power from Macro eNodeB is larger, the user equipment may often attempt RRC (Radio Resource)_Connected to further Macro eNodeB, not to close Pico eNodeB. However, since it is advantageous to connect to a base station having smaller propagation loss in an uplink in view of battery consumption of a terminal and it is important to obtain cell division gain by allocating user equipment to the picocell in HetNet environment, it is required to solve a problem that user equipment is made to connect only to Macro eNodeB.

Then, Rel-10 specifies a technique called a range expansion. The range expansion will be explained with reference to FIG. 25. When selecting a cell, that is, determining a base station to enter, the user equipment selects to enter eNodeB which has larger power based on received power (RSRP: Reference Signal Received Power) obtained from a reference signal (cell-specific reference signal) from eNodeB. When evaluating RSRP of each eNodeB, an area where the user equipment entering Pico eNodeB exists is enlarged by adding an offset of 10 dB to RSRP of Pico eNodeB to evaluate, for example. This is the range expansion and the enlarged area is called a range expansion area. The range expansion area is an area in which RSRP offset, that is a technique of the range expansion, allows the user equipment to enter Pico eNodeB even in a case that the user equipment generally enters Macro eNodeB due to the low RSRP from Pico eNodeB.

For the user equipment existing in the range expansion area, received power from Macro eNodeB is sometimes greater than received power from entered Pico eNodeB. In other words, in the range expansion area, there is a disadvantage that reception in the user equipment from Pico eNodeB is weak against interference from Macro eNodeB. This is why, in the range expansion area, interference in the downlink between Pico eNodeB and Macro eNodeB becomes a problem.

For example, there has been proposed a communication system including a base station device for managing a mobile station device and a macrocell, and a home base station device for managing a femtocell, a picocell, a nanocell home cell, and the communication system adjusts interference to home base station device (see Patent Document 1, for example). However, this communication system does not adjust interference in the downlink to a user equipment in a range expansion area.

CITATION LIST

Patent Document

Patent Document 1: JP 2011-77964 A

SUMMARY OF THE INVENTION

Problems to be Solved by the Invention

An object of the technique disclosed in this specification is to provide a radio communication device, a radio communication method, and a radio communication system, which are superior for preferably suppressing interference between cells in a radio communication environment in which cells in different sizes are layered.

Another object of the technique disclosed in this specification is to provide a radio communication device, a radio communication method, and a radio communication system, which are superior for preferably restricting interference between cells in a downlink to a terminal by functioning as a base station in a radio communication environment in which cells in different sizes are layered.

Solutions to Problems

The present invention describes a radio communication device configured to place control information included in a beginning of a downlink subframe, which is transmitted from the device as a base station, in a frequency band separated from control information of downlink subframe transmitted from an adjacent base station as synchronizing.

In the radio communication device, the control information is placed in a band including a predetermined position when common control information which is specified to be sequentially placed from the predetermined position and addressed to all terminals in a cell of the device is included, and the control information is placed in a band which does not include the predetermined position when the common control information is not included.

In the radio communication device, the device does not include the common control information to the control information when the adjacent base station includes the common control information.

In the radio communication device, when the common control information is included, the common control information is sequentially placed from the predetermined position and control information of each terminal in the cell of the device is placed in a band separated from the adjacent base station. When the common control information is not included, control information of each terminal in the cell of the device is placed in a band separated from the adjacent base station as skipping a region where the adjacent base station places the common control information.

In the radio communication device, plural bands with different bandwidths can be selected to use; and a band with a bandwidth larger than that of the adjacent base station is selected when a cell radius is larger than that of the adjacent base station, and a band with a bandwidth smaller than that of the adjacent base station is selected when the cell radius is smaller than that of the adjacent base station.

In the radio communication device, when a band with a bandwidth larger than that of the adjacent base station is selected, the control information of the cell of the device is placed as skipping the frequency band where the adjacent base station places the control information.

In the radio communication device, when a band with a bandwidth larger than that of the adjacent base station is selected and common control information, which is specified to be sequentially placed from a predetermined position and addressed to all terminals in the cell of the device, is included, the common control information is sequentially placed from the predetermined position as skipping the frequency band where the adjacent base station places the control information.

In the radio communication device, when a band with a bandwidth lager than that of the adjacent base station is selected and common control information which is specified to be sequentially placed from a predetermined position and is addressed to all terminals in the cell of the device, is included, the common control information is sequentially placed from the predetermined position including the frequency band where the adjacent base station places the control information.

In the radio communication device, when a band with a bandwidth smaller than that of the adjacent base station is selected, control information for each terminal in the cell of the device is placed as skipping the region where the adjacent base station sequentially places the common control information from the predetermined position.

Further, the present application describes a radio communication device configured to place control information included in a beginning of a downlink subframe, which is transmitted from the device as a base station, as skipping a frequency band which overlaps with a particular signal included in a user information area of a downlink subframe which an adjacent base station transmits as causing a time lag.

In the radio communication device, interference with the user information area in a subframe can be eliminated via a predetermined communication interface between base stations; and among control information included in a beginning of a downlink subframe of a cell of the device, a frequency band which overlaps with a particular signal included in the user information area of the downlink subframe which the adjacent base station transmits as causing a time lag is changed to a user information area.

In the radio communication device, the control information is placed at a beginning of the downlink subframe of a cell of the device, as skipping a frequency band which overlaps with a particular signal included in the user information area of the downlink subframe which the adjacent base station transmits as causing a time lag.

In the radio communication device, a calculation method is applied to calculate a location where to place control information for each terminal in the cell of the device as skipping the frequency band which overlaps with the particular signal included in the user information area of the downlink subframe which the adjacent base station transmits as causing a time lag.

In the radio communication device, plural bands of different bandwidths can be selected to use; and in a case that common control information addressed to all terminals in the cell of the device is sequentially placed from the predetermined position according to a specification and, since a band having a bandwidth equal to or lower than a predetermined bandwidth is selected, the band reaches to a frequency band which overlaps with the particular signal included in the user information area of the downlink subframe which the adjacent base station transmits as causing a time lag, the common control information is not used, and in a case that a band with a bandwidth greater than the predetermined bandwidth is selected, the common control information can be used.

In the radio communication device, plural bands of different bandwidths can be selected to use; and in a case that common control information addressed to all terminals in the cell of the device is sequentially placed from a predetermined position according to a specification and, since a band having a bandwidth equal to or lower than a predetermined bandwidth is selected, the band reaches to the frequency band which overlaps with the particular signal included in the user information area of the downlink subframe which the adjacent base station transmits as causing a time lag, the common control information is sequentially placed from the predetermined position as skipping the frequency band which overlaps with the particular signal.

In the radio communication device, in a first downlink subframe of a cell of the device, among control information included in the beginning, a frequency band which overlaps with a particular signal included in a user information area of a downlink subframe which the adjacent base station transmits as causing a time lag is changed to a user information area; and in a second downlink subframe of the cell of the device, the control information is placed as skipping the frequency band which overlaps with the particular signal included in the user information area of the downlink subframe which the adjacent base station transmits as causing a time lag.

In the radio communication device, when the device as a base station transmits a downlink radio frame, which is composed of plural subframes, a placement as skipping a frequency band which overlaps with a particular signal is performed only to a subframe which overlaps with the subframe in which the adjacent base station includes the particular signal in the user information area.

Further, the technique described in this application is a radio communication device including:

a synchronization detecting unit configured to operate as a terminal and detect synchronization with a base station;

a first frame timing maintaining unit configured to maintain information of a frame synchronization position when synchronizing with a first base station;

a second frame timing maintaining unit configured to maintain information of a frame synchronization position when synchronizing with a second base station; and a shift amount recognition and inform unit configured to recognize a shift amount in synchronization by comparing the frame synchronization position maintained in the first frame timing maintaining unit and the frame synchronization position maintained in the second frame timing maintaining unit, and inform the recognized shift amount in synchronization to the first base station when resynchronizing with the first base station.

Further, the technique described in this application is a radio communication method including:

a step for placing control information included in a beginning of a downlink subframe, which is transmitted from the device as a base station, in a frequency band separated from control information of a downlink subframe transmitted by an adjacent base station as synchronizing; and a step for transmitting the downlink subframe.

Further, the technique described in this application is a radio communication method including:

a step for placing control information included in a beginning of a downlink subframe, which is transmitted from the device as a base station, as skipping a frequency band which overlaps with a particular signal included in a user information area of a downlink subframe which an adjacent base station transmits as causing a time lag; and a step for transmitting the downlink subframe.

Further, the technique described in this application is a radio communication method including:

a first frame timing maintaining step for detecting synchronization with a first base station and maintaining information of its frame synchronization position;

a second frame timing maintaining step for detecting synchronization with a second base station and maintaining information of its frame synchronization position;

a shift amount recognizing step for recognizing a shift amount in synchronization by comparing the frame synchronization position maintained in the first frame timing maintaining step and the frame synchronization position maintained in the second frame timing maintaining step; and a shift amount informing step for resynchronizing with the first base station and informing the recognized shift amount in synchronization to the first base station.

Further, the technique described in this application is a radio communication system including:

a first base station having a first cell having a first cell radius; and a second base station having a second cell having a second cell radius smaller than the first cell radius and existing in the first cell, wherein the first base station places control information, which is included in a beginning of a downlink subframe, in a frequency band which is separated from control information of a downlink subframe which the second base station transmits as synchronizing.

It is noted that the "system" here represents logical assembling of plural devices (or function modules which realize specific functions) and the devices or function modules may or may not be in a single chassis (This is applied to the followings too).

Further, the technique described in this application is a radio communication system including:

a first base station having a first cell having a first cell radius; and a second base station having a second cell having a second cell radius smaller than the first cell radius and existing in the first cell. In the first base station places control information, which is included in a beginning of a downlink subframe, as skipping a frequency band which overlaps with a particular signal included in a user information area of a downlink subframe which the second base station transmits as causing a time lag.

Further, the technique described in this application is a radio communication system including:

a first base station having a first cell having a first cell radius;

a second base station having a second cell having a second cell radius smaller than the first cell radius and existing in the first cell; and one or more terminals. At least one terminal maintains information of a frame synchronization position when synchronizing with each base station, recognizes a shift amount by comparing a frame synchronization position of the first base station and a frame synchronization position of the second base station, and informs the shift amount to the first base station via an uplink when resynchronizing with the first base station.

Effects of the Invention

The technique disclosed in this specification can preferably provide a radio communication device, a radio communication method, and a radio communication system which are superior for functioning as a base station and preferably suppressing interference between cells in a downlink to a terminal in a range expansion area, in a radio communication environment in which cells in difference sizes are layered.

The technique disclosed in this specification can improve throughput in each cell since an interference issue can be efficiently solved between Macro eNodeB and Pico eNodeB.

Further objects, characteristics, and advantages of the technique disclosed in this specification will be obvious in the following embodiments and detailed explanations based on attached figures.

BRIEF DESCRIPTION OF DRAWINGS

FIG. 2 is a figure illustrating a manner that a PDCCH part with higher frequency is allocated to Pico eNodeB, a part with lower frequency is allocated to Macro eNodeB, and Macro eNodeB sequentially places a common search space from a beginning of CCE candidates.

FIG. 3 is a figure illustrating a manner that a common search space allocated to Macro eNodeB is sequentially placed from the beginning of CCE candidates on a priority basis.

MODE FOR CARRYING OUT THE INVENTION

Hereinafter, an embodiment of a technique disclosed by this description will be explained in detail with reference to the drawings.

Figure 26:
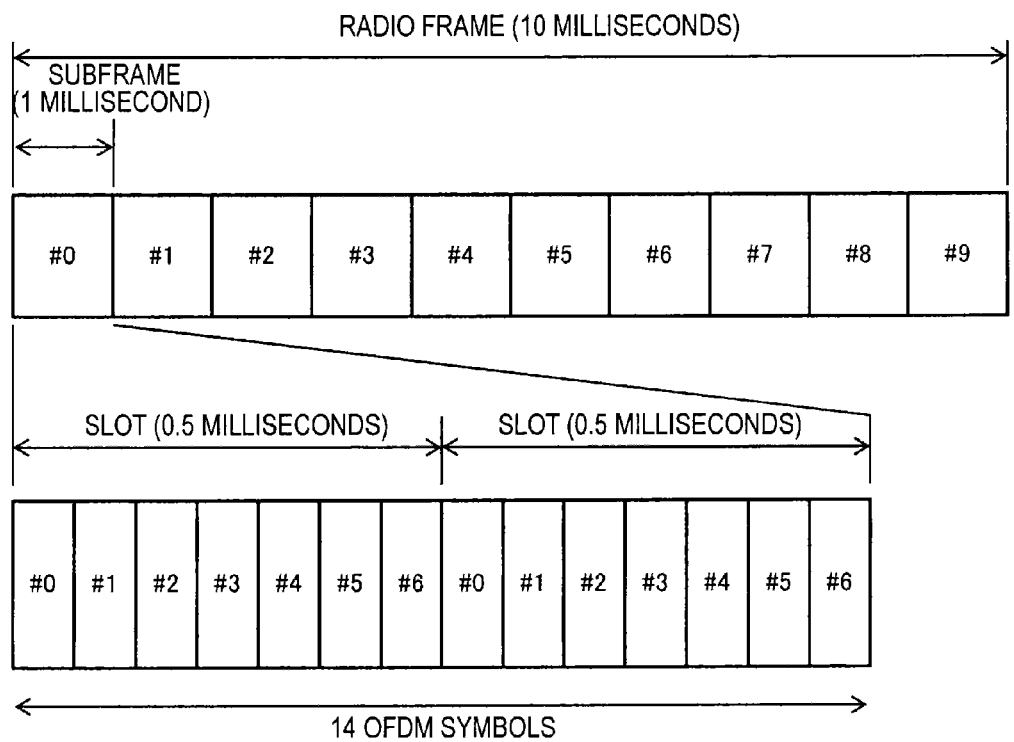
FIG. 26 is a figure illustrating a configuration of an LTE downlink radio frame.

FIG. 26 illustrates a configuration of an LTE downlink radio frame. As illustrated, the radio frame is hierarchized in three layers of time slots (slots), subframes, and radio frames in the order of shorter time unit.

A slot of 0.5 millisecond length is composed of seven OFDM symbols (in a case of normal unicast transmission) and is used as a unit of a demodulation process when receiving in a user (mobile station) side. A subframe of 1 millisecond length is composed of two consecutive slots (14 OFDM symbols) and is used as one correction-coded data packet transmission time unit. A radio frame of 10 millisecond length is composed of 10 consecutive subframes (that is, 20 slots) and is used as a basic unit for multiplex in all physical channel. The subframe has a PDCCH part used for a control signal from eNodeB and a PDSCH part used for user data.

Respective users can communicate without interfering with each other by using different subcarriers or different slots. In LTE, consecutive subcarriers are blocked and a minimum unit for a radio resource allocation, which is called "resource block (RB)," is defined. A scheduler mounted in the base station allocates a radio resource to the respective users in a unit of resource block. The resource block is composed of 12 subcarriers times 1 slot (seven OFDM symbols=0.5 milliseconds). Further, at most three OFDM symbols from a beginning of the subframe are used as a control channel PDCCH. The scheduler of the base station can allocate a resource block per subframe, that is, at one-millisecond intervals. Position information of the resource block is called scheduling. Uplink scheduling information and downlink scheduling information are both written in a downlink control channel. Looking at the control channel, each user can recognize the resource block allocated to the user.

A slot having 0.5 milli length is an allocation minimum unit which is usable by each user. The scheduler mounted in the base station allocates a slot, which can be used by the slot, to each user. In LTE, two duplex communication systems of FDD and TDD can be selected. A case of TDD allows to select, in every subframe, whether to use in an uplink or a downlink.

As illustrated in FIG. 26, the downlink radio frame is composed of 10 consecutive subframes, and a synchronization signal and system information are respectively inserted at predetermined positions.

Figure 27:
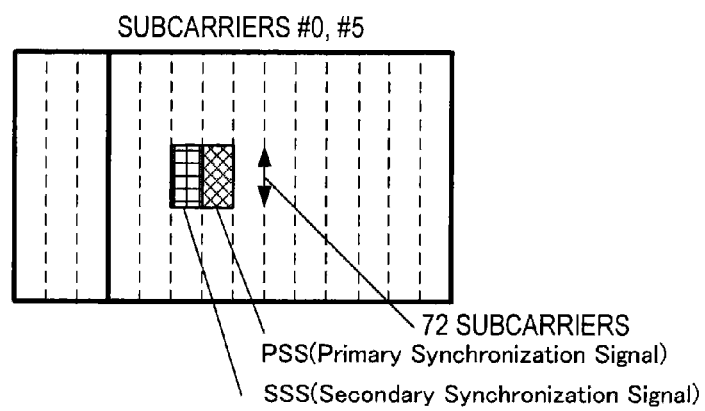
FIG. 27 is a figure illustrating a location of an FDD downlink subframe where synchronization signals PSS and SSS are inserted.
Figure 28:
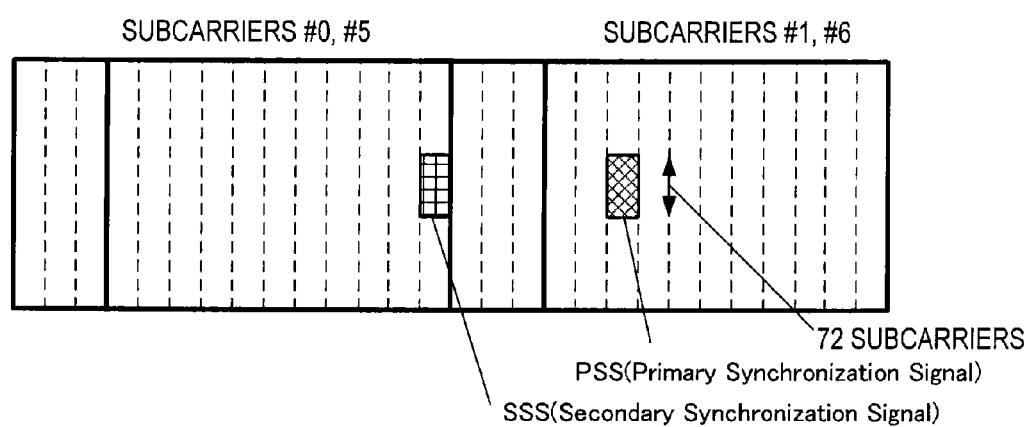
FIG. 28 is a figure illustrating a location of a TDD downlink subframe where synchronization signals PSS and SSS are inserted.

The synchronization signal has two types of PSS (Primary Synchronization Signal) and SSS (Secondary Synchronization Signal). The positions of the subframe and an OFDM symbol to which the synchronization signal is inserted differ between a case that the duplex mode is FDD and a case that the duplex mode is TDD. In a case of FDD, as illustrated in FIG. 27, a PSS and an SSS are both inserted to subframes #0 and #5. The PSS is inserted to a last OFDM symbol in a first slot and an SSS is inserted to an OFDM symbol immediately before the last OFDM symbol. Further, in a case of TDD, as illustrated in FIG. 28, a PSS is inserted to a position of a sixth OFDM symbol from the beginning of the first slot in subframes #1 and #6 and an SSS is inserted to the last OFDM of a second slot in subframes #0 and #5. In both cases, 72 subcarriers at a center of a band to be used are applied. Since the synchronization signal is a signal that a user equipment firstly receives, it may be the most important signal in all downlink signals. When this signal cannot be received, the user equipment cannot execute following steps to enter a cell.

Figure 29:
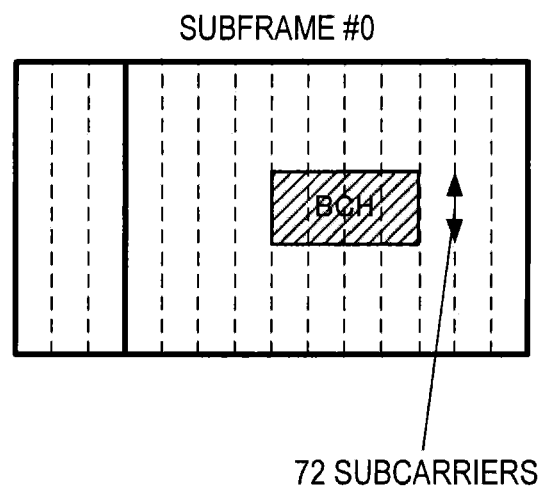
FIG. 29 is a figure illustrating a location of a downlink subframe where system information BCH is inserted.

Further, in the system information, an MIB (Master Information Block) and an SIB (System Information Block) are included. In the MIB, necessary information to receive data at the first step, such as a bandwidth to be used, a system frame number, a hybrid ACK configuration, and the like is stored. The SIB is other system information and is important information; however, the MIB is more important information. The MIB is transmitted via a channel called BCH (broadcast channel). The SIB is specified to be transmitted via PDSCH. In both of the cases that duplex mode is FDD and TDD, as illustrated in FIG. 29, BCH is inserted to a fourth OFDM symbol from the beginning of a second slot in subframe #0 and 72 subcarriers at the center of the frequency band are used. Since a range of the BCH is extremely important, it is extremely important to avoid interference with the BCH.

Here, an interference issue in a downlink between Pico eNodeB and Macro eNodeB in a range expansion area specified in 3GPP Rel-10 will be discussed in addition to the column of Background Art.

As described above, for the user equipment existing in a range expansion area, received power from the Macro eNodeB is sometimes greater than received power from current Pico eNodeB. In other words, in the range expansion area, there is a problem that the reception in the user equipment is easily interfered by Macro eNodeB.

Further, as described above, since it is assumed that there is an X2 interface between Macro eNodeB and Pico eNodeB, interference with the PDSCH part in the subframe is already solved by Rel-8 ICIC. However, in a range expansion area, interference with PDCCH part may be a problem even when the PDSCH part is adjusted using the Rel-8 ICIC techniques.

In Rel-8, PDCCH is designed so as to be able to stand against interference between Macro eNodeBs having similar transmission output power. However, in Rel-10, since RSRP is evaluated by the range expansion, there is a problem that Macro eNodeB transmits at a large power of several dozen dB compared to the Pico eNodeB and PDCCH transmitted from the Pico eNodeB easily receives interference caused by PDCCH transmitted from Macro eNodeB. Particularly, a user equipment in the range expansion area cannot receive PDCCH from the Pico eNodeB.

Thus, Rel-10 ICIC has an object to reduce interference between a macrocell and a picocell. Rel-10 ICIC has a solution that some subframes among 10 subframes in a radio frame transmitted from the Macro eNodeB are selected not to output. These subframes that are stopped to be output are referred to as ABS (Almost Blanc Subframe).

Figure 30:
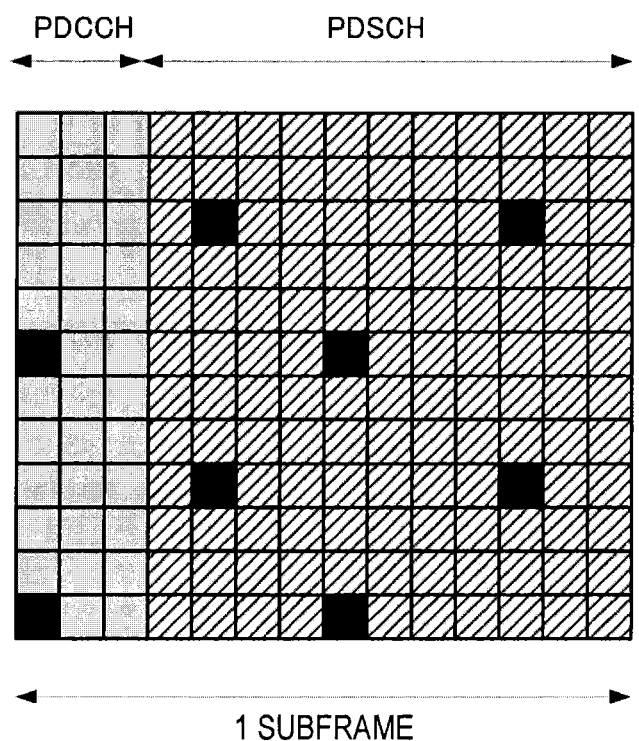
FIG. 30 is a figure illustrating an example of a general subframe configuration.

FIG. 30 illustrates an example of a common subframe configuration. In the figure, the horizontal axis represents time and the vertical axis represents frequencies. The subframe is composed of a control signal PDCCH from the eNodeB and PDSCH which is used as user data (as described above). In the example of the figure, the first three OFDM symbols from the beginning are PDCCH and the forth and the other following OFDM symbols are PDSCH. Further, signals called CRS (Cell-Specific Reference Signal) are inserted to both PDCCH and PDSCH respectively. In FIG. 30, the black-filled parts in the resource block represent the CRS signals. Even when trying to stop signals of the subframe which is normally downloaded, only data part in PDSCH part can be stopped. The PDSCH part can be stopped when the scheduler of the base station stops an allocation to PDSCH. However, the base station cannot stop CRSs in PDSCH. Similarly, the base station cannot stop cell specific reference signals in PDCCH, either. In other words, even when ABS is set, CRSs have to be inserted to common subframes.

In 3GPP Rel-10, in order to stop the CRSs in PDSCH, ABS subframes are set as subframes of MBSFN (Multimedia Broadband Single Frequency Network). The MBSFN subframe is a subframe used in broadcasting using SFN, and common CRSs are not transmitted. There is a characteristic that the user equipment does not have to receive CRSs in PDSCH when recognizing the MBSFN subframe. The CRSs in PDSCH can be stopped by making the common ABS subframes look like MBSFN to the user equipment.

Figure 31:
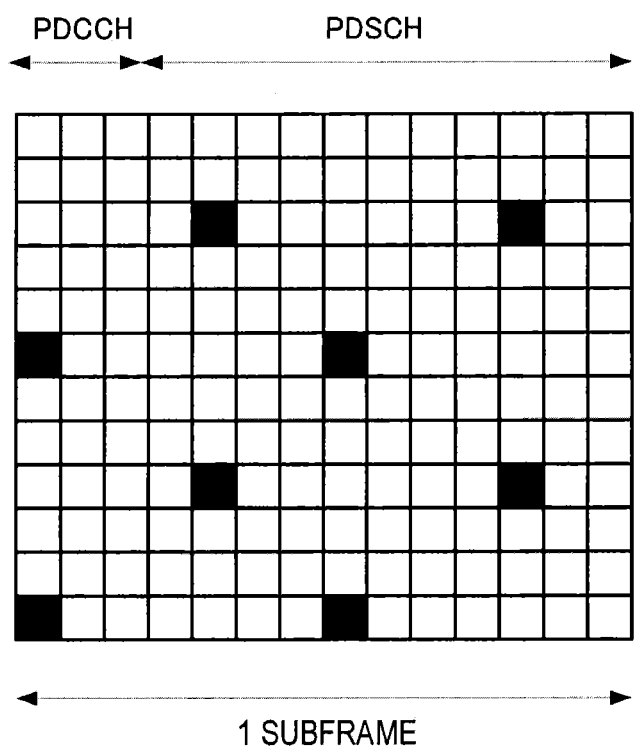
FIG. 31 is a figure illustrating an example of a subframe configuration to which a general ABS is set.
Figure 32:
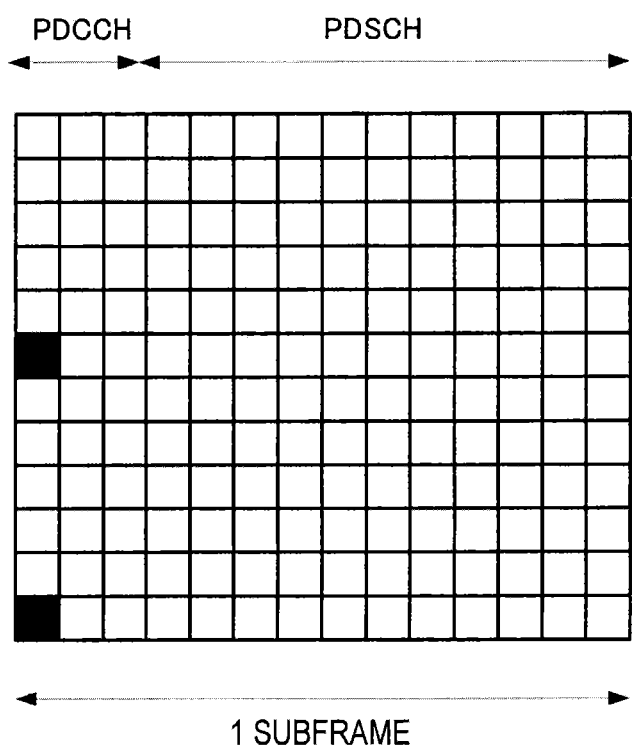
FIG. 32 is a figure illustrating an example of a subframe configuration to which an MBSFN-type ABS is set.

In other words, in Rel-10, as ABSs, there are two ABS types, which are a common ABS and an MBSFN type. Regarding the common ABS subframe, as illustrated in FIG. 31, only CRSs in PDCCH and PDSCH remain and other parts are not transmitted. Further, regarding the MBSFN-type ABS subframe, as illustrated in FIG. 32, only CRSs in PDCCH remains and other parts are not transmitted. In FIGS. 31 and 32, the black-filled parts in the resource block represent CRS signals and the blank parts in the resource represent non-transmitting part.

As described above, in the range expansion area, a signal reception by the user equipment from Pico eNodeB is weak against interference caused by Macro eNodeB. On the other hand, as illustrated in FIGS. 31 and 32, since most part of the subframe set as an ABS is not transmitted, the subframe of Pico eNodeB corresponding to the subframe set as an ABS in Macro eNodeB has resistance to interference. Thus, when the Pico eNodeB allocates more resources for user equipment in the range expansion area to the subframe set as an ABS in Macro eNodeB, downlink communication can be efficiently performed as avoiding interference.

Figure 33:
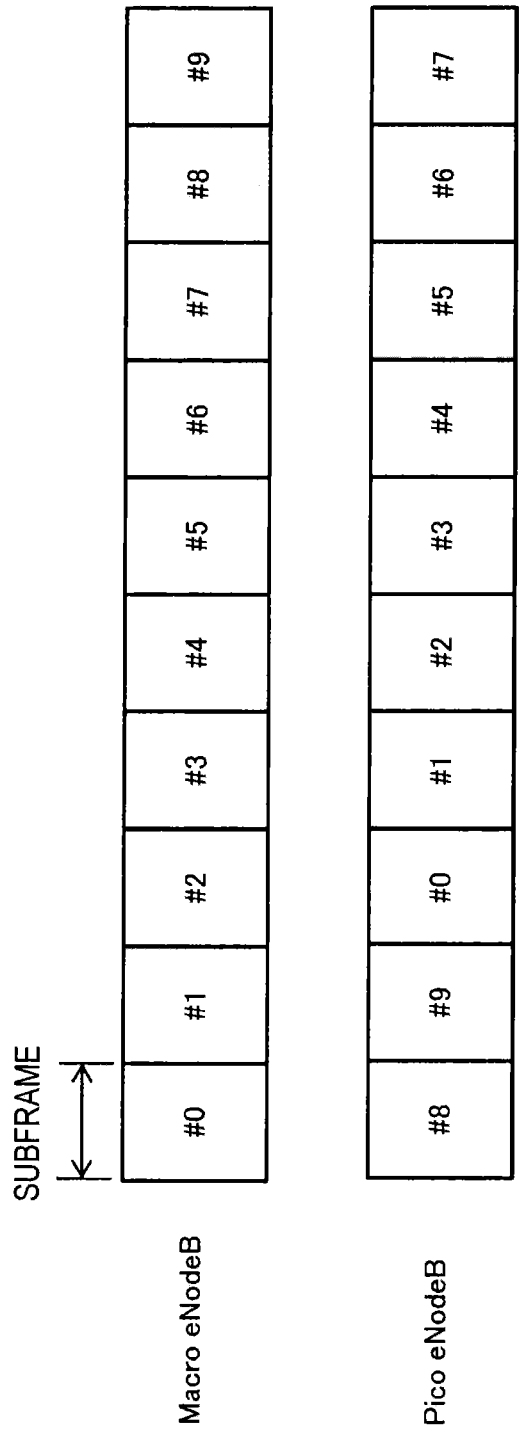
FIG. 33 is a figure illustrating an example that an offset is set to subframes of Macro eNodeB and Pico eNodeB.
Figure 34:
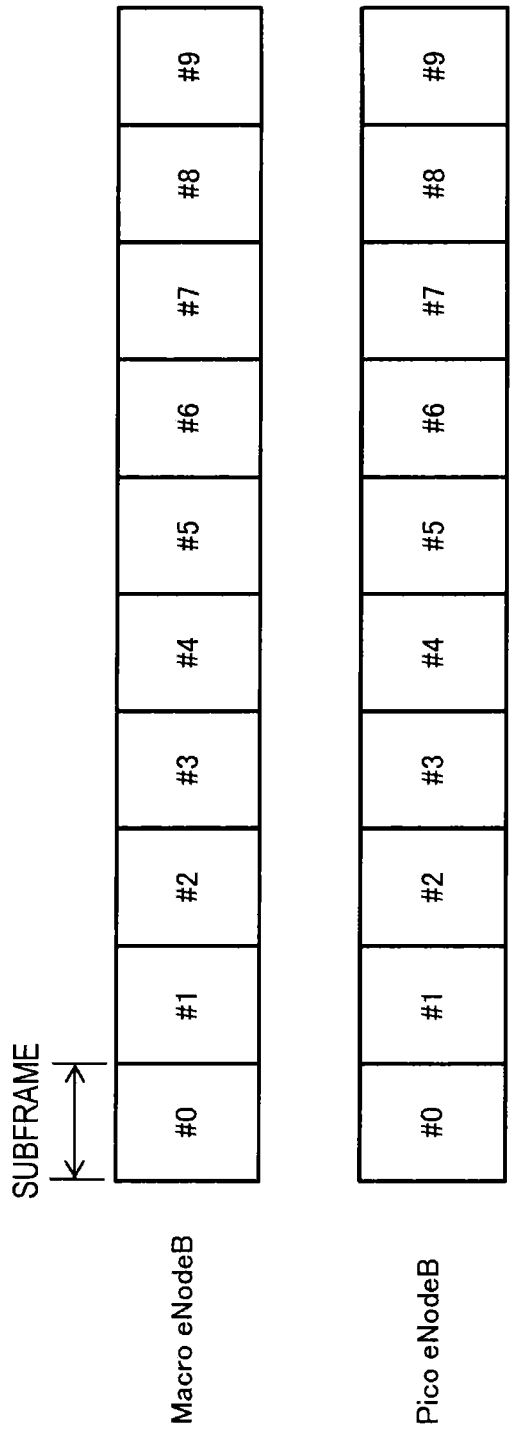
FIG. 34 is a figure illustrating an example that an offset is not set to subframes of Macro eNodeB and Pico eNodeB.

Regarding the subframes of Macro eNodeB and Pico eNodeB, an operation with an offset and an operation without an offset can be considered. FIG. 33 illustrates an example of a case that an offset is added to subframes of Macro eNodeB and Pico eNodeB. Further, FIG. 34 illustrates an example of a case that an offset is not added to subframes of Macro eNodeB and Pico eNodeB.

As described above with reference to FIGS. 27 to 29, the synchronization signal and the system information, which are extremely important to be protected from interference, are inserted to particular subframe positions in the radio frame. The eNodeB cannot stop transmitting these signals. When an offset is not added to the subframe as illustrated in FIG. 34, since the positions of subframes, to which the synchronization signals PSS, SSS and system information BCH are inserted, match in the cases of Macro eNodeB and Pico eNodeB, collision cannot be avoided by setting an ABS by Macro eNodeB.

On the other hand, in the operation that an offset is added to the subframe as illustrated in FIG. 33, the positions of subframes, to which the synchronization signals PSS, SSS and system information BCH are inserted, do not match in the cases of Macro eNodeB and Pico eNodeB. For example, Pico eNodeB may add an offset to the subframe which is set as ABS by Macro eNodeB so as to be able to transmit the synchronization signals PSS, SSS and the system information BCH. Thus, when the interference of the signals of the synchronization signals PSS, SSS and system information BCH between eNodeBs is considered, an operation that an offset is added to subframes of Macro eNodeB and Pico eNodeB may become popular.

In addition, regarding subframes which are set as ABS, most transmissions in both PDCCH and PDSCH are stopped. The interference at the PDSCH part in the subframe has been already solved by Rel-8 ICIC as described above. PDSCH is still made stopped because of the ABS setting because PDCCH includes scheduling information in which resource block each user equipment performs a reception, and PDSCH cannot be transmitted by stopping only PDCCH.

Here, a decoding method of PDCCH will be explained.

PDCCH transmission is performed in a unit of resource element composed of 36 OFDM symbols called CCE (Control Channel Element). Since PDCCH is modulated by QPSK (Quadrature Phase Shift Keying), 72 bit information can be transmitted by a unit of CCE. To the CCE, an aggregation, that is, repeat transmission of the same information is applied. As a repetition numbers, which are CCE aggregation levels, values of 1, 2, 4 and 8 can be used. It is obvious that SN improves when the CCE aggregation level increases. When the cell radius enlarges, the CCE aggregation level increases in order to prevent SN deterioration.

When the location of CCE addressed to the user equipment cannot be recognized, the user equipment performs blind decoding, in other words, attempts decoding before anything. Then, when there is no CRC (Cyclic Redundancy Check) error, the user equipment recognizes that the CCE is addressed to itself. In eNodeB, since a CRC is added to each CCE by using a user equipment unique number (UE identity=C-RNTI (Cell Radio Network Temporary Identity)), a CRC error occurs in cases other than the corresponding user equipment.

Regarding the blind decoding, all CCEs including the user equipment in PDCCH has to be decoded and the load of the user equipment becomes heavy. Thus, Rel-8 employs a technique called search space. The search space is divided into a common search space and a UE specific search space. The common search space is sequentially placed from the beginning of CCE candidates. The common search space does not exist when the CCE aggregation level is 4 or 8 (In other words, the common search space exists only when the cell radius is large). Further, the region of the common search space requires 16 CCEs. Since one CCE is composed of 36 symbols, 576 subcarriers from lower frequency in the first OFDM symbol is the common search space.

The CCE in the UE specific search space is encoded by masking the CRC by the UE identity. Thus, the user equipment performs a CRC check by blind decoding in the UE specific search space, in other words, using its own UE identity, and recognizes that it is a CCE addressed to itself when there is no error in CRC. Further, the common search space is made that all the user equipment attempts blind decoding by using two identities, which are the UE identity and the common identity.

The eNodeB and the user equipment have a common function (hash function) in order to determine the location of UE specific search space. When the UE identity and a subframe number are input to this function, a location where the user equipment is required to decode CCE, that is, the search space in the UE specific search space of the subframe, can be obtained as an output of the function. The hash function is a function to calculate an output value which seems to be at random with respect to an input (general knowledge). When a UE identity and a subframe number are input to the hash function, a region, which looks like at random within a certain area, is output. Thus, when the UE identity or the subframe is different, different search spaces are output from the hash function in most cases. Even if the search spaces of two or more user equipment match by calculating this function, there is a high possibility that the search spaces do not match in the following subframe.

In LTE, six bandwidths from 1.4 MHz to 20 MHz can be selected. The number of subcarriers in each bandwidth is shown in following Table 1.

TABLE 1

| Bandwidth [Hz] | Number of subcarriers |
| --- | --- |
| 1.4M | 76 |
| 3M | 151 |
| 5M | 301 |
| 10M | 601 |
| 15M | 901 |
| 20M | 1201 |

In each bandwidth, the number of CCE inserted to an OFDM symbol corresponds to a value which is calculated by dividing the number of subcarriers by 36. Thus, when the bandwidth is 20 MHz, the CCE inserted in the OFDM symbol can be found as about 33 (1201/36), according to above Table 1.

Problems that the technique disclosed in this description solves and corresponding methods can be categorized into major three cases: a case that the synchronization between Macro eNodeB and Pico eNodeB is perfect, a case that the synchronization is not perfect, and a case of an issue that caused during an actual operation.

Problem 1: A method that enables to transmit PDSCH part of ABS of Rel-10 when synchronization between Macro eNodeB and Pico eNodeB is perfect As illustrated in FIG. 31, in a subframe of a common ABS, CRSs of PDCCH and PDSCH remain and other parts are not transmitted. Further, as illustrated in FIG. 32, in a subframe of an MBSFN-type ABS, only CRSs of PDCCH remain and other parts are not transmitted. When Macro eNodeB stops transmitting the PDCCH part in order to avoid an interference in the PDCCH part, a control signal is not included so that the PDSCH part in the subframe also has to be stopped to transmit. However, when stopping transmission of everything in this manner, regardless of that the interference in the PDSCH part has been already solved by Rel-8 ICIC (described above), a remarkable throughput degradation may be caused.

Means 1: There proposed a method for dividing parts used for PDCCH in Macro eNodeB and Pico eNodeB in order to enable to transmit the PDSCH part of ABS of Rel-10 when synchronization between Macro eNodeB and Pico eNodeB is perfect.

Figure 1:
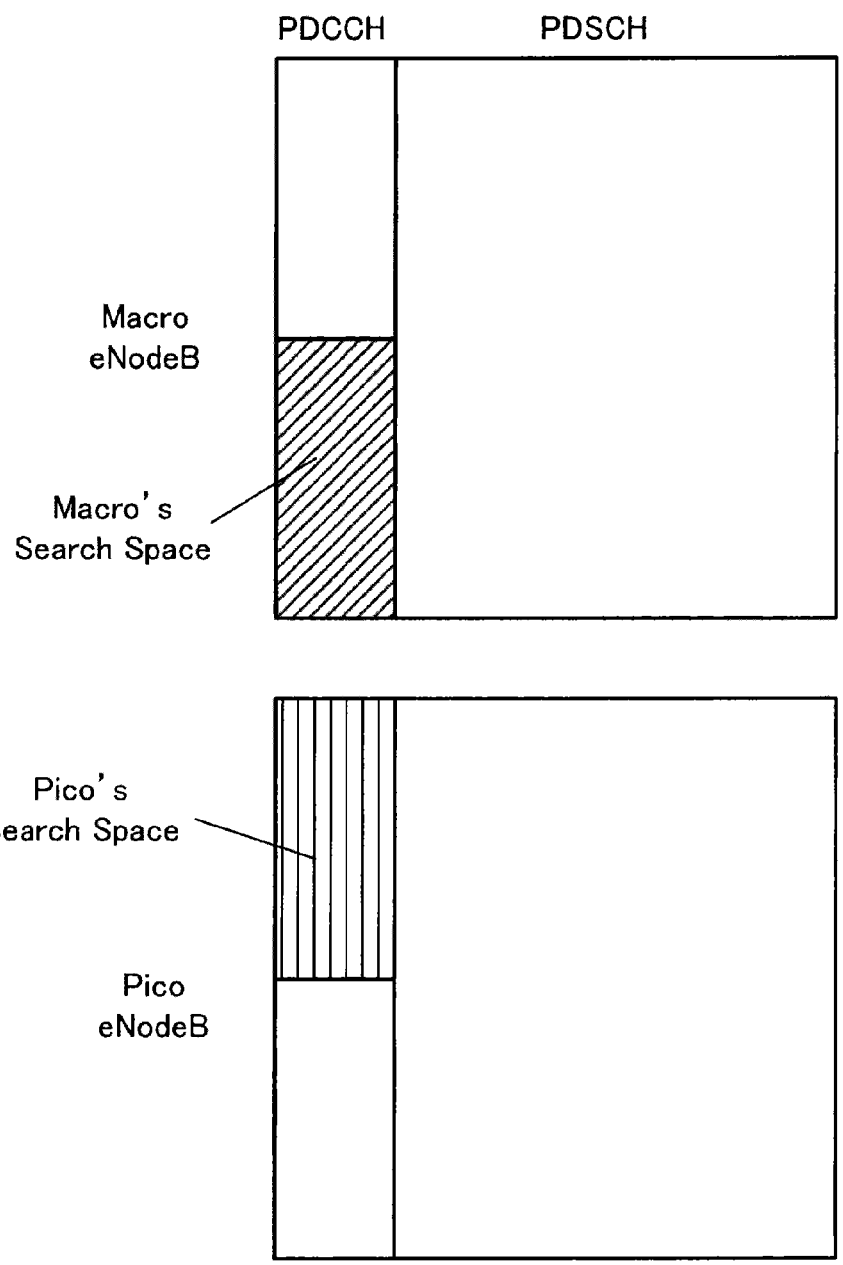
FIG. 1 is a figure illustrating a manner that PDCCH parts that Macro eNodeB and Pico eNodeB respectively use are divided with search spaces.

It is possible to divide the PDCCH part by using the above described search space. FIG. 1 illustrates a manner of dividing with a search space in a part that Macro eNodeB and Pico eNodeB respectively use for PDCCH. When each eNodeB creates a different search space to divide PDCCH in this manner, this can prevent to lose all data of PDCCH due to interference. In other words, since the user equipment can maintain the control signal in the PDSCH part, the eNodeB can output PDSCH signal and the throughput improves. Macro eNodeB and Pico eNodeB can inform the part to divide PDCCH to each other via the X2 interface, for example.

Problem 1-1: Problem 1 Derived from the Division of the PDCCH Part with the Search Space in Means 1

When the cell is small, the CCE aggregation level becomes small such as 1 or 2 and it is not required to place a common search space. However, when the cell is large, the CCE aggregation level is large such as 4 or 8 and it is required to place a common search space. As described above, it is agreed that the common search space is placed sequentially from the beginning of CCE candidates (that is, from an OFDM symbol having lower frequency in PDCCH). According to the usage of PDCCH illustrated in FIG. 1, since different search space is created to divide PDCCH part between Macro eNodeB and Pico eNodeB, only one of the eNodeBs uses from the beginning of CCE candidates, the placement is not useful to use common search space for the other eNodeB.

Figure 25:
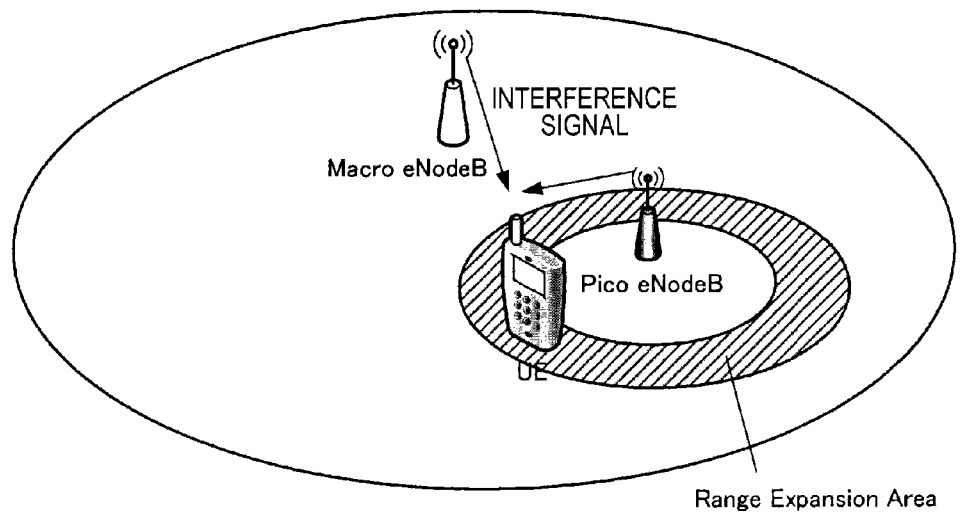
FIG. 25 is a figure explaining a range expansion specified by 3GPP Rel-10.

Means 1-1:

As understood from FIG. 25, it is assumed that a macro cell has a large cell radius; however, the picocell has a small cell radius and it is difficult to assume that the CCE aggregation level becomes 4 or 8 (in other words, a common search space is required). Thus, when the CCE aggregation level of 4 or 8 is allocated to Macro eNodeB, the CCE aggregation level of 1 or 2 is made to be allocated to Pico eNodeB. In this case, there is a combination that Macro eNodeB uses the common search space while Pico eNodeB does not use the common search space. Thus, by allocating the PDCCH part with higher frequency to Pico eNodeB and the PDCCH part with lower frequency to Macro eNodeB, Macro eNodeB can sequentially place the common search space from the beginning of CCE candidates as illustrated in FIG. 2. On the other hand, since Pico eNodeB does not require a common search space, a search space can be created in the PDCCH part with higher frequency.

Macro eNodeB is required to place a common search space and is able to inform Pico eNodeB that the PDCCH with lower frequency is used via the X2 interface for example.

Problem 1-2: Problem 2 Derived from the Division of the PDCCH Part with the Search Space in Means 1

As illustrated in FIG. 2, a method for allocating a common search space only to Macro eNodeB is further considered. As described above, a region of the common search space requires 16 CCEs. When it is calculated as subcarriers, the common search space is 576 subcarriers from lower frequency in the first OFDM symbol. Since the number of subcarriers when Macro eNodeB selects a bandwidth of 20 MHz is 1201 (see Table 1), as illustrated in FIG. 2, all common search space can be set in a frequency region allocated to Macro eNodeB by allocating a half of the PDCCH part having a lower frequency to Macro eNodeB. However, for example, when operating in a frequency equal to or lower than 5 MHz, since everything from the beginning to the first OFDM symbol becomes a common search space, Means 1-1, that is, an allocation of PDCCH part illustrated in FIG. 2, cannot be performed.

Means 1-2:

As illustrated in FIG. 3, giving high priority to the common search space allocated to Macro eNodeB, CCE candidates are sequentially placed from the beginning. Then, after allocating lower frequency to Macro eNodeB, the UE specific search space of Pico eNodeB is placed as skipping the region, in which the common search space is placed, in the PDCCH part with higher frequency. Although it is not illustrated in FIG. 3, when the common search space that is folded from the second OFDM symbol or later exceeds a half of the side of lower frequency, the UE specific search space of Pico eNodeB is similarly placed as skipping the part.

Macro eNodeB can inform location information where the common search space is placed to Pico eNodeB by using the X2 interface, for example.

Problem 2: Method for Enabling Transmission of PDSCH Part of ABS Using ICIC Between Bands Having Different Bandwidth when Synchronization Between Macro eNodeB and Pico eNodeB is Perfect The above description describes interference between eNodeBs having the same bandwidth such as between Macro eNodeB that operates in a band of 20 MHz and Pico eNodeB that operates in a band of 20 MHz.

Figure 4:
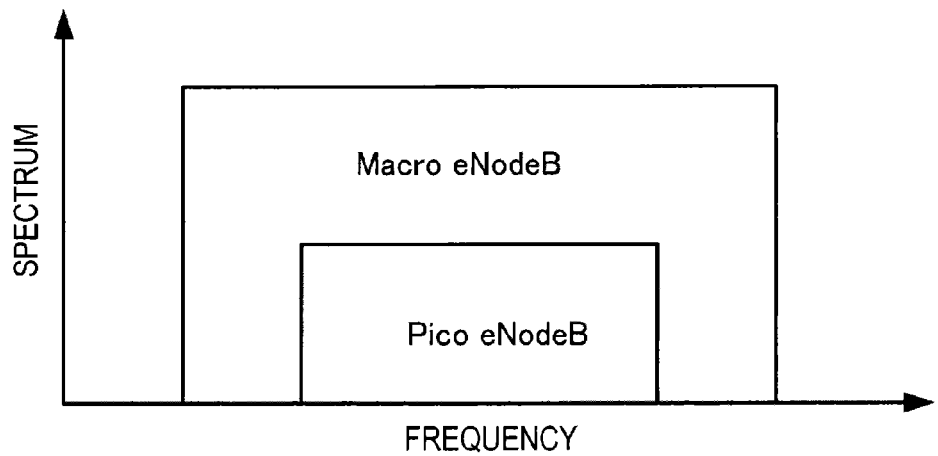
FIG. 4 is a figure illustrating a case that a bandwidth of Pico eNodeB is smaller than a bandwidth of Macro eNodeB.

However, in an HetNet environment in which cells in different sizes are layered, as illustrated in FIG. 4 for example, it is assumed that the bandwidth of Pico eNodeB is smaller than the bandwidth of Macro eNodeB. As making the bandwidth small, there is an advantage that the cost of Pico eNodeB, which has a large number of shipment, can be reduced. As understood from FIG. 4, the subframe of Macro eNodeB has a band which is not overlapped with (that is, does not have interference with) the subframe of Pico eNodeB.

Rel-10 ICIC has a solution to provide some subframes that stops outputting ABS (described above). However, even though the subframe of Macro eNodeB has a band which does not interfere with the subframe of Pico eNodeB, there is a problem that, when output of the entire subframe is stopped, throughput in the macrocell side remarkably decreases.

Figure 5:
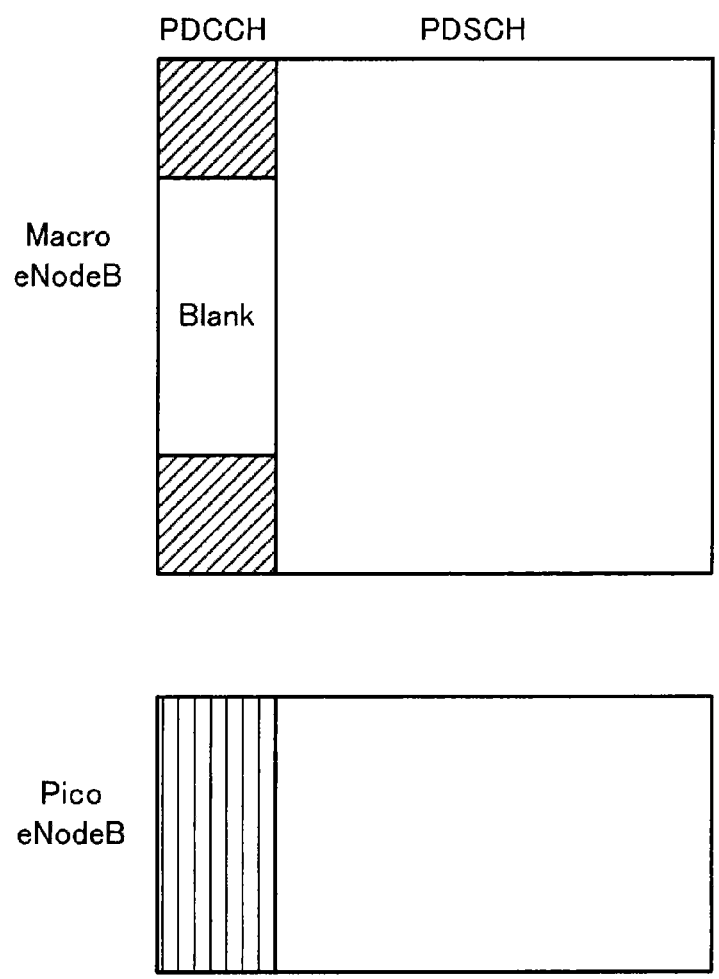
FIG. 5 is a figure illustrating a manner that Macro eNodeB eliminates PDCCH of Pico eNodeB from search space candidates when the bandwidths used by Macro eNodeB and Pico eNodeB are different.

Means 2:

Assuming a case that the synchronization between Macro eNodeB and Pico eNodeB is perfect, a section of PDCCH part is overlapped between Macro eNodeB and Pico eNodeB. Then, a part of the overlapped section, which is probably at the central part, is used as PDCCH of Pico eNodeB and own search space is placed. On the other hand, as illustrated in FIG. 5, Macro eNodeB transmits radio wave as eliminating the part corresponding to the central part from the search space candidate. This allows both eNodeBs coexist. On the other hand, the PDSCH part is already solved by Rel-8 ICIC (described above).

Problem 2-2: Problem Derived from Means 2 in which Macro eNodeB Eliminates the Band Used by Pico eNodeB from Search Space Candidate In the example illustrated in FIG. 5, Macro eNodeB provides a blank at the central part of the using frequency band to keep out of the PDCCH of Pico eNodeB. Here, when Macro eNodeB sets a common search space and place common search space sequentially from the beginning of CCE candidates, the space may sometimes exceed the area where the blank is provided. Such a case becomes a problem because Macro eNodeB cannot transmit the common search space.

Figure 6:
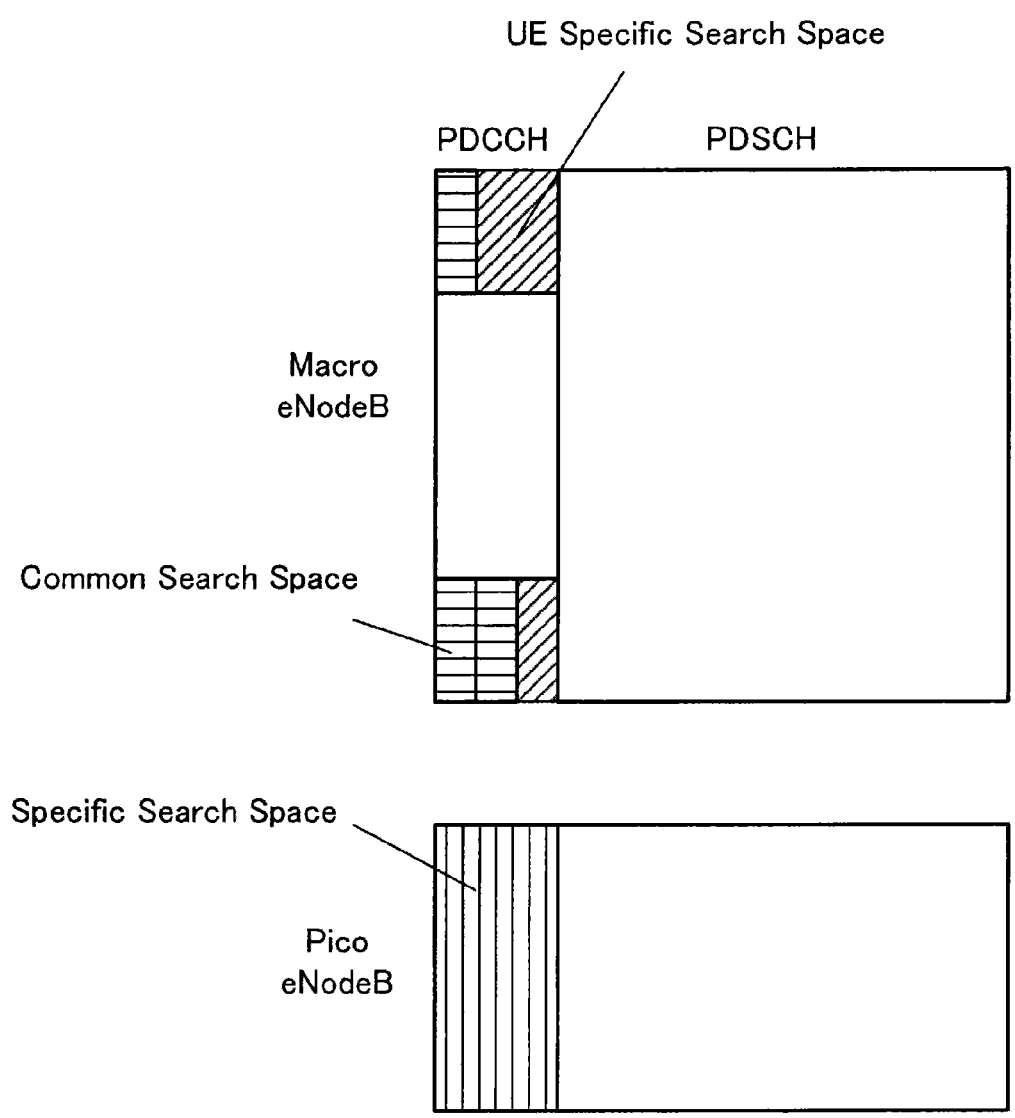
FIG. 6 is a figure illustrating a manner that Macro eNodeB places a common search space as skipping the bandwidth that Pico eNodeB uses.

Means 2-2-1:

As one of solving means of the Problem 2-2, as illustrated in FIG. 6, Macro eNodeB places the common search space as skipping the bandwidth used by Pico eNodeB. The common search space is generally specified by LTE so as to be sequentially placed from the CCE upper primary level. On the other hand, in Means 2-2-1, a blank is created in the common search space.

In a case that the user equipment which receives such a subframe is a legacy terminal compliant with a conventional specification such as Rel-8, when the blank part in the common search space is decoded, CRC becomes an error so that a process not to obtain control information is performed. On the other hand, a user equipment that can recognize the blank provided as a part of the common search space (that is, being compatible with Method 2-2) recognizes the range of the common search space of FIG. 6 and performs blind decoding the range. On the other hand, since Pico eNodeB has a small cell radius and the CCE aggregation level is 1 or 2, a common search space is not placed.

Figure 7:
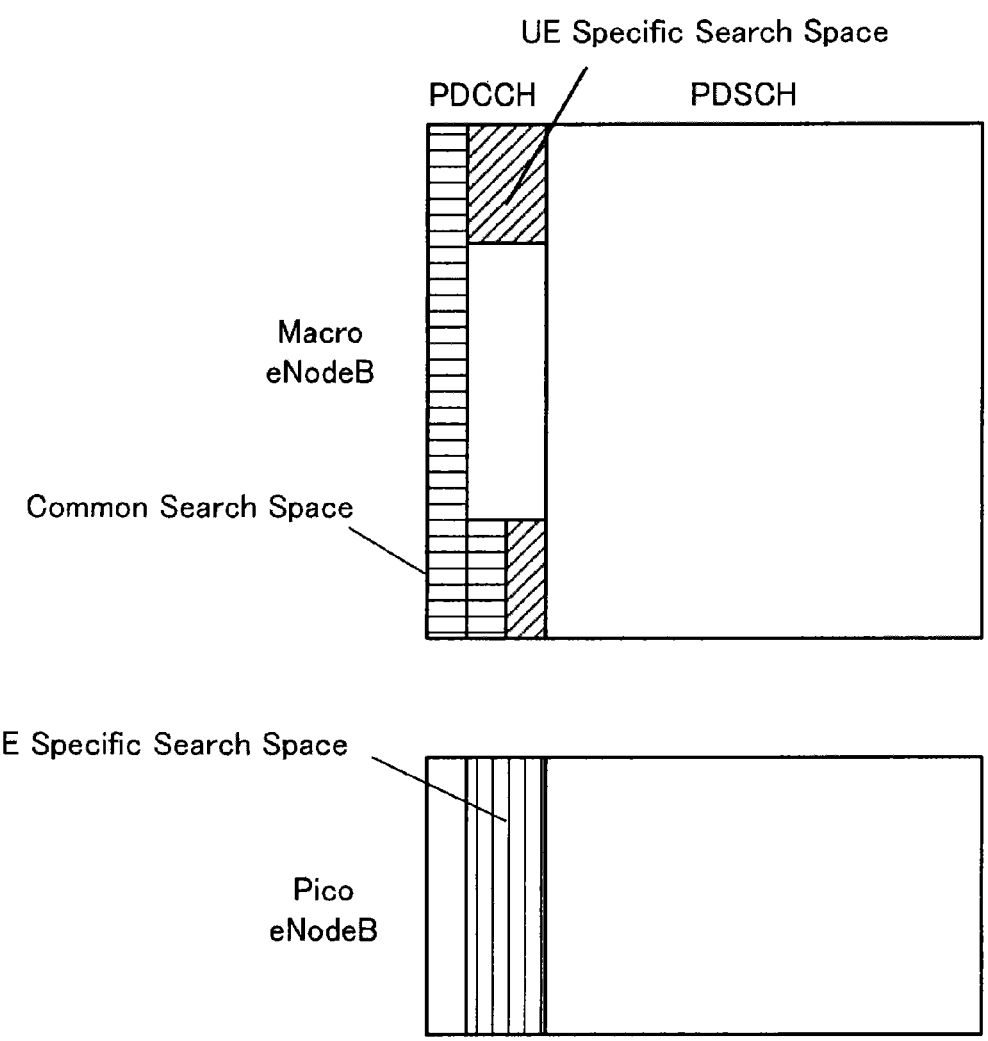
FIG. 7 is a figure illustrating a manner that the common search space allocated to Macro eNodeB is sequentially placed from the beginning of CCE candidates on priority basis.

Method 2-2-2:

As another solving means of above Problem 2-2, as illustrated in FIG. 7, the common search space allocated to Macro eNodeB is given priority to be placed sequentially from the beginning of CCE candidates. Then, Macro eNodeB places the rest of search space as skipping the central part of the band used as PDCCH by Pico eNodeB.

Macro eNodeB can inform the range where the common search space is sequentially placed from the beginning from CCE candidates to Pico eNodeB via the X2 interface, for example. Pico eNodeB places own search space at the central part of the band as skipping the part overlapping with the common search space placed by Macro eNodeB. Since Pico eNodeB has a small cell radius and the CCE aggregation level is 1 or 2, a common search space is not placed.

Figure 17:
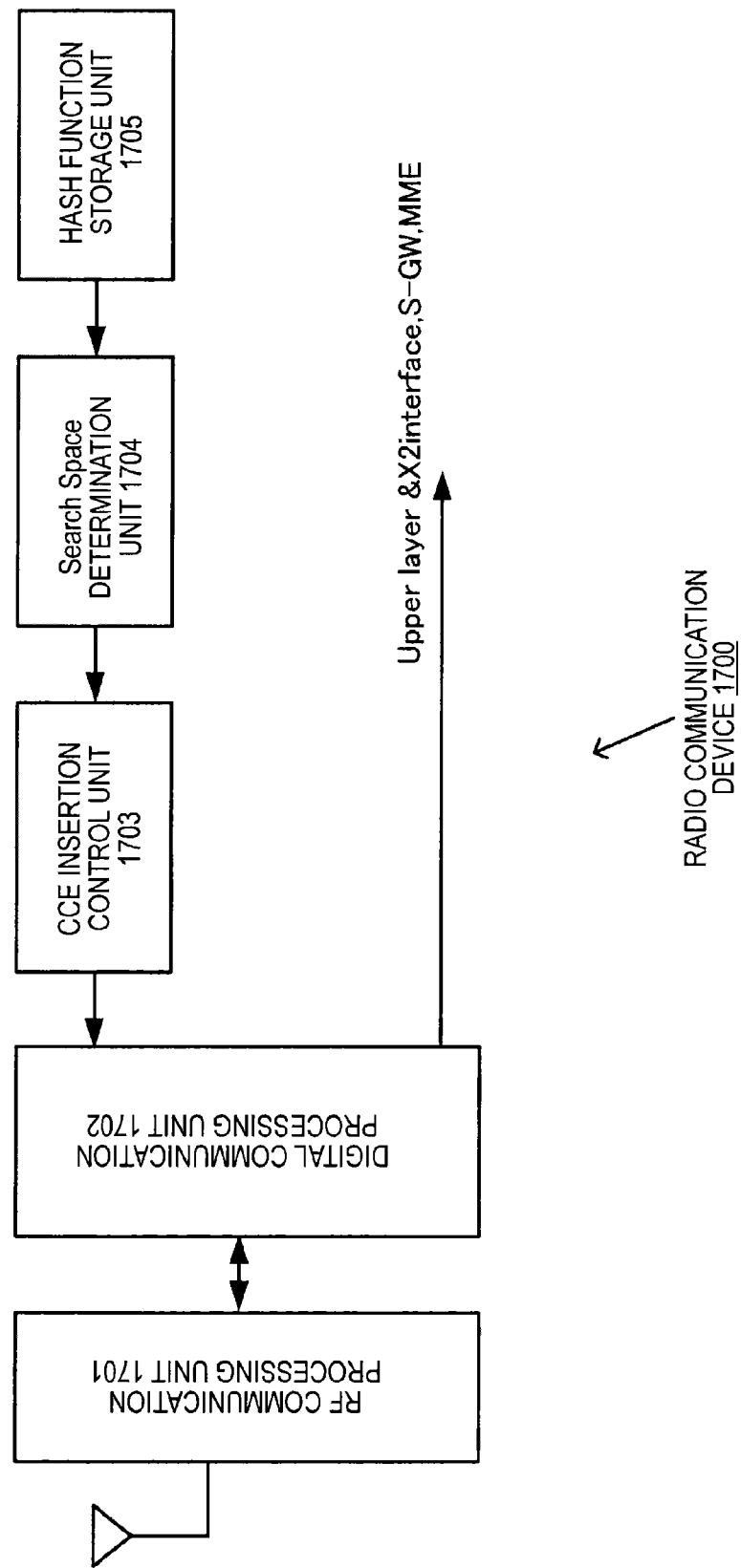
FIG. 17 is a figure schematically illustrating a configuration example of a radio communication device 1700 that operates as Macro eNodeB.

FIG. 17 schematically illustrates a configuration example of a radio communication device 1700 which operates as Macro eNodeB that realizes each means corresponding to the above Problems 1 and 2.

The radio communication device 1700 includes an RF communication processing unit 1701 which performs an analog process of radio signal transmitted and received via an antenna, and a digital communication processing unit 1702 which modulates a digital transmission signal and demodulates a digital reception signal. The digital communication processing unit 1702 exchanges transmission and reception data in upper layer protocols of communication layer of the device 1700. Further, the digital communication processing unit 1702 communicates with other eNodeBs via an X2 interface, an S-GW (Serving Gateway), and an MME (Mobility Management Entity).

A search space determination unit 1704 determines a location of the search space. Further, the search space determination unit 1704 determines the location of UE Specific search spaces of each user equipment existing in the own cell by using a hash function stored in a hash function storage unit 1705. Then, a CCE insertion control unit 1703 controls an insertion of each CCE to PDCCH based on the determined UE specific search space.

Figure 18:
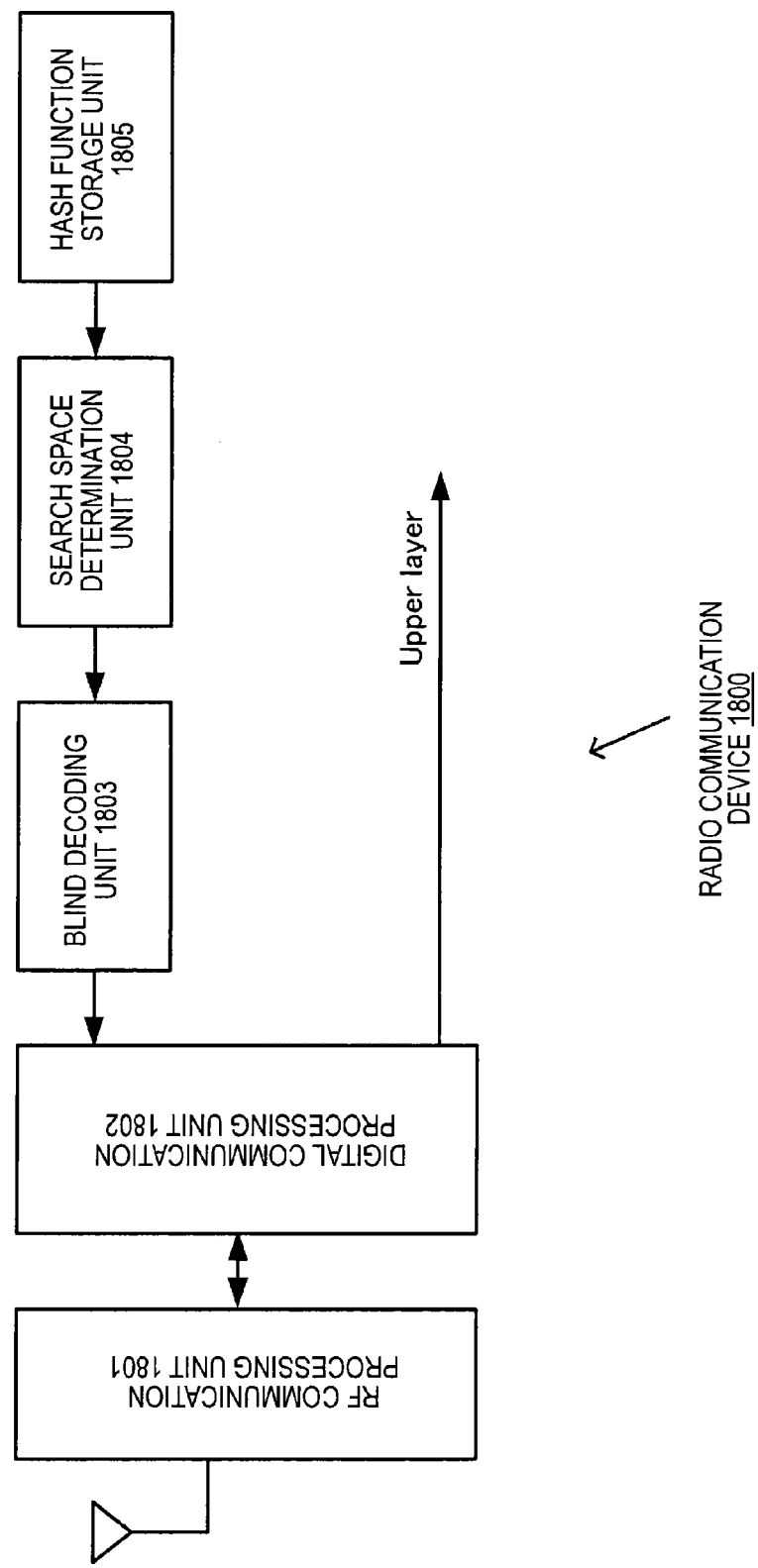
FIG. 18 is a figure schematically illustrating a configuration example of a radio communication device 1800 that operates as a user equipment belonging to Macro eNodeB.

Further, FIG. 18 schematically illustrates a configuration example of a radio communication device 1800 which operates as a user equipment belonging to Macro eNodeB illustrated in FIG. 17.

The radio communication device 1800 includes an RF communication processing unit 1801 which performs an analog process of a radio signal transmitted and received via an antenna, and a digital communication processing unit 1802 which modulates a digital transmission signal and demodulates a digital reception signal. The digital communication processing unit 1802 exchanges transmission and reception data in upper layer protocols of communication layer of the device 1800.

A search space determination unit 1804 determines a location of a search space. Further, the search space determination unit 1804 determines a location of a UE specific search space of the own terminal by using a hash function stored in a hash function storage unit 1805. Then, a blind decoding unit 1803 performs blind decoding the PDCCH of Macro eNodeB based on the determined UE specific search space.

Next, problems and corresponding means in a case that there is a time lag in a unit of an OFDM symbol in a synchronization between eNodeBs will be considered.

Problem 3: Synchronization signals PSS, SSS and system information BCH are extremely important and it is extremely important to control interference to these signals. As illustrated in FIGS. 27 to 29, these signals are inserted to PDSCH at a particular subframe position. Thus, when synchronized between eNodeBs, interference to these signals is an interference issue of the PDSCH part, which is solved by Rel-8 ICIC. However, when there is a gap in the synchronization between Macro eNodeB and Pico eNodeB, one of eNodeB may give interference to BCH, PSS and SSS of the PDCCH of the other eNodeB.

Due to imperfection of the synchronization between Macro eNodeB and Pico eNodeB, the position of PDCCH may be shifted by a unit of an OFDM symbol. Further, in order to avoid interference between PDCCHs, there may be a case that an offset of the synchronization position may be explicitly performed by a unit of an OFDM symbol. In either of these two use cases, there is a problem that the PDCCH of the macrocell give interference to BCH, PSS and SSS of the picocell.

Different methods for interference to BCH, PSS and SSS have to be taken according to a degree of shifting from PDCCH of eNodeB, which is the interference source. Further, different methods have to be taken for TDD and FDD since the synchronization signals PSS and SSS are inserted to different locations in subframes in cases of FDD and TDD (see FIGS. 27 and 28).

Figure 8:
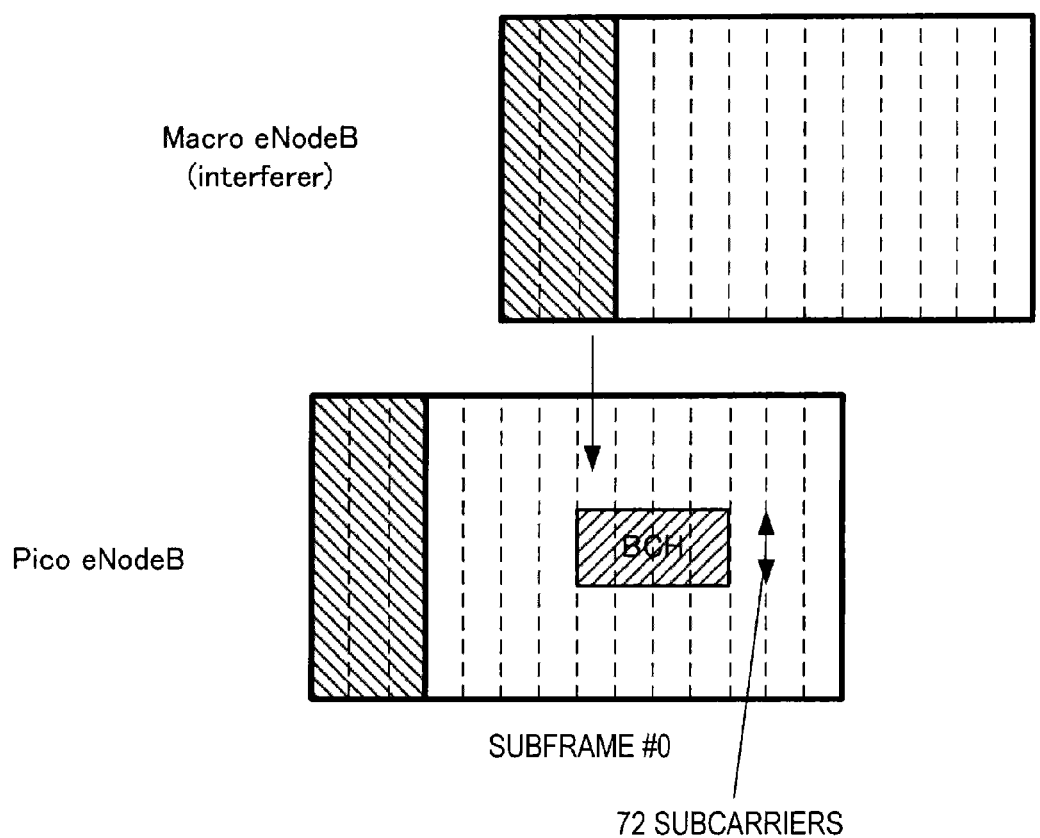
FIG. 8 is a figure illustrating a manner that a subframe of Macro eNodeB is shifted and a third OFDM symbol of PDCCH of Macro eNodeB is temporally at the same position with BCH of subframe #0 of Pico eNodeB.

Means 3-1: Method to Avoid Interference without Using a Later Half of PDCCH of eNodeB as an Interference Source As illustrated in FIG. 8, interference becomes a problem when the subframe of Macro eNodeB is shifted and the third OFDM symbol of PDCCH of Macro eNodeB is temporally at the same position with BCH of located in 72 subcarriers at the center of the beginning frame in the second slot of subframe #0 of Pico eNodeB.

Figure 9:
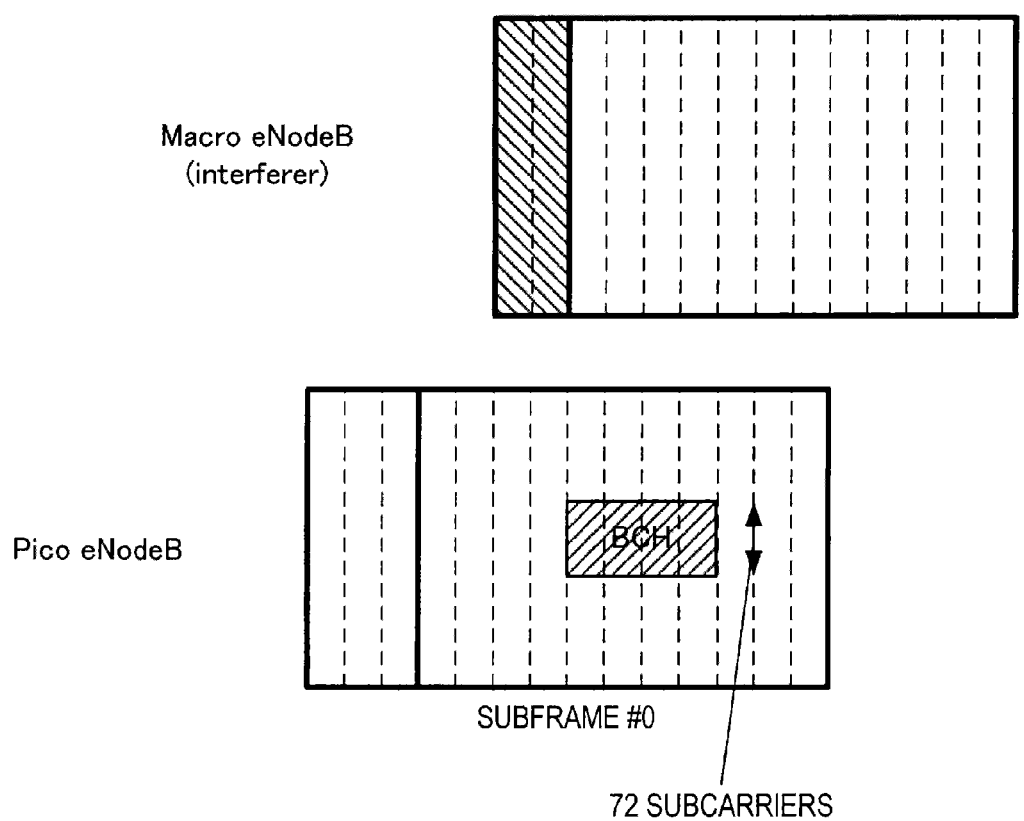
FIG. 9 is a figure illustrating a manner that Macro eNodeB reduces the number of OFDM symbols of PDCCH to avoid interference with BCH of Pico eNodeB.

LTE specifies that in PDCCH region can be transmitted using two OFDM symbols. Thus, in a case illustrated in FIG. 8, the third OFDM symbol that gives interference to BCH of Pico eNodeB in PDCCH of Macro eNodeB is switched to PDSCH and PDCCH is transmitted only by the first and second OFDM symbols (see FIG. 9). Since the third OFDM symbol of Macro eNodeB is switched to PDSCH, BCH of Pico eNodeB is overlapped only with PDSCH part of Macro eNodeB. Thus, by using Rel-8 ICIC, interference to BCH of Pico eNodeB can be controlled.

Figure 10:
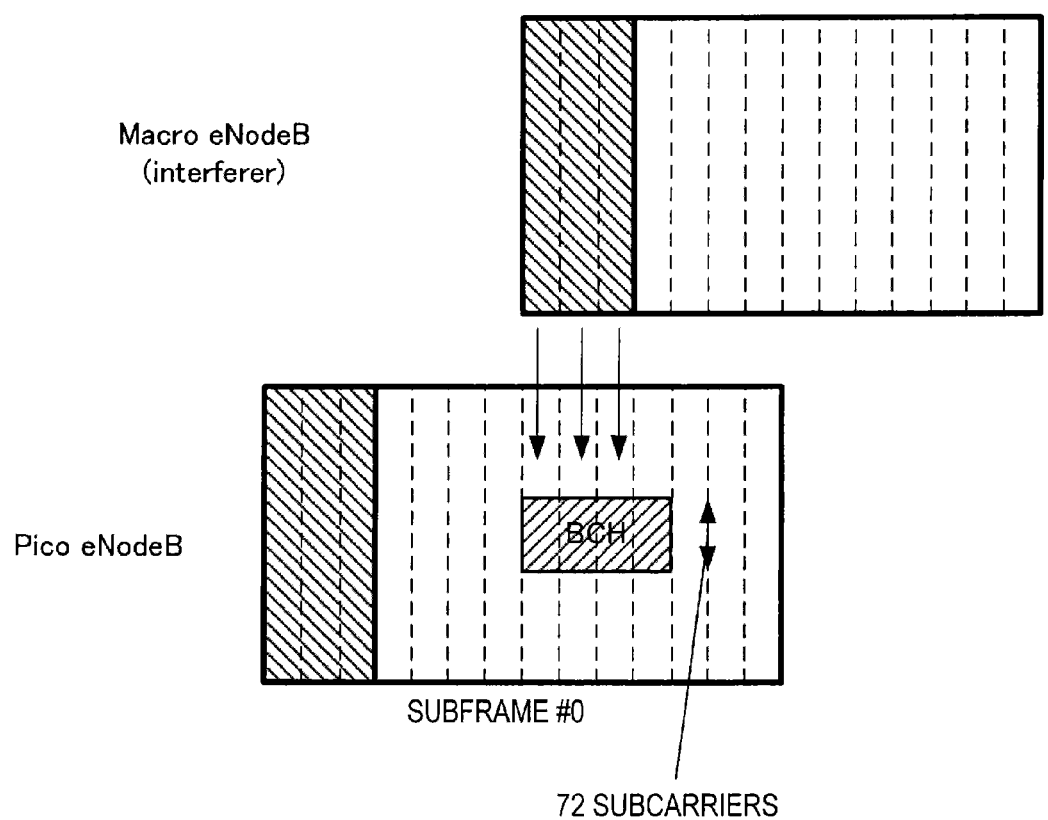
FIG. 10 is a figure illustrating a manner that the subframe of Macro eNodeB is shifted and all of first to third OFDM symbols of PDCCH of Macro eNodeB are temporally at the same position with BCH of Pico eNodeB.
Figure 11:
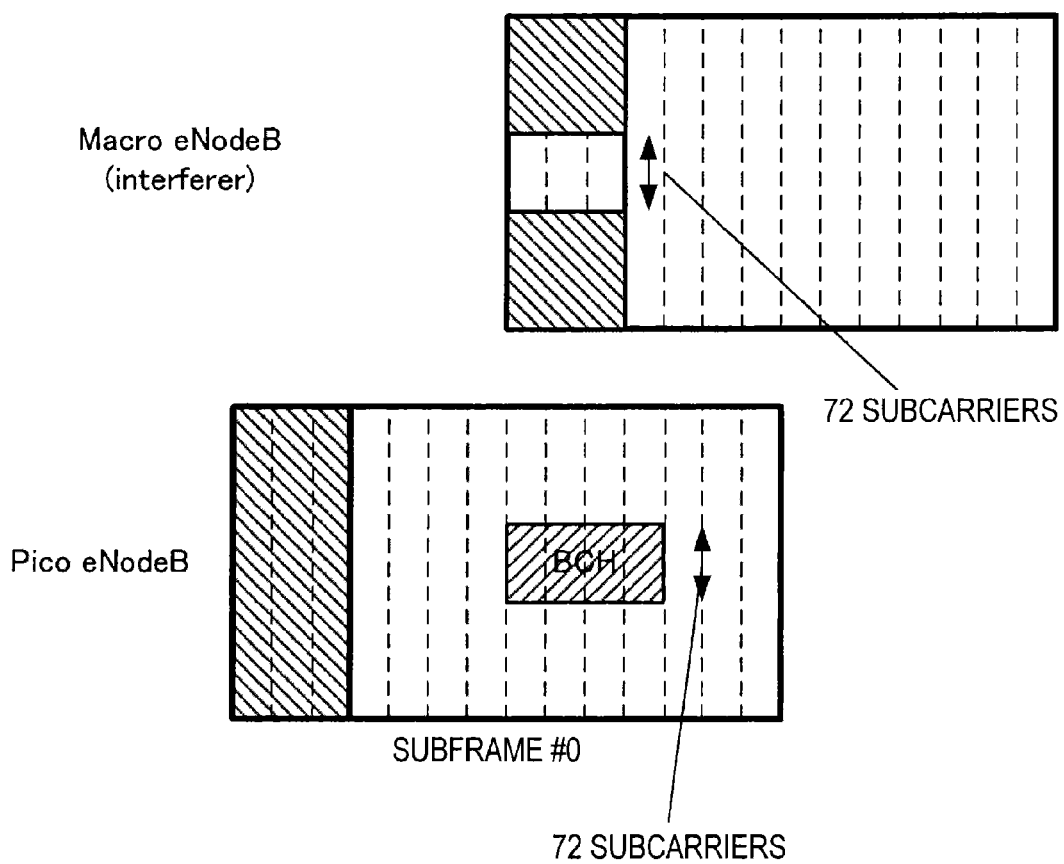
FIG. 11 is a figure illustrating a manner that a UE specific search space corresponding to PDCCH of Macro eNodeB are specified as skipping central 72 subcarriers to avoid interference with BCH of Pico eNodeB.

Means 3-2: Method to Restrict a Region of UE Specific Search Space of PDCCH of eNodeB as an Interference Source As illustrated in FIG. 10, interference becomes a problem when the subframe of Macro eNodeB is shifted and all of the first to third OFDM symbols of PDCCH of Macro eNodeB are temporally at the same position with BCH of Pico eNodeB. In this case, the method of Means 3-1 cannot be used. This is because at least the first OFDM symbol of PDCCH has to be transmitted. Then, as illustrated in FIG. 11, the UE specific search space for PDCCH of Macro eNodeB is specified as skipping the central 72 subcarriers used for BCH so as not to interfere with BCH of Pico eNodeB.

The control signal itself is placed as skipping the central 72 subcarriers. Thus, even when the central 72 subcarriers are not skipped from the search space of user equipment, and even if the user equipment performs blind decoding CCE of the central 72 subcarrier part, there is no problem because CRC becomes an error. Alternatively, the user equipment may perform an operation to recognize not to search this part as a UE specific search space and not to decode. The latter has an advantage that load of the user equipment is reduced.

As a method to make the user equipment not to search or decode the central 72 subcarrier part, the hash function that determines a location of the UE specific search space may specify as skipping the central 72 subcarrier part. As one of the methods, the central 72 subcarrier part may be skipped from the address specified by the hash function before specifying.

Further, there is a method that the specification of the hash function can be made from a region in the left side of the 72 subcarriers, and a method that the region in the right side is made the same as that in the left side.

Means 3-3: Method to Restrict the Position of Common Search Space of PDCCH of eNodeB as an Interference Source The method to restrict the search space region according to Means 3-2 is made under an assumption that the search space is a UE specific search space. However, Macro eNodeB requires a common search space in some cases according to the cell radius so that the common search space has to be sequentially placed from the beginning of CCE. It is not preferable to stop transmitting a common search space since it is a region that all the user equipment search and perform blind decoding. When the common search space is placed as skipping the central 72 subcarriers as illustrated in FIG. 11, it becomes a problem when the common search space reaches to the region of the central 72 subcarriers.

Figure 12:
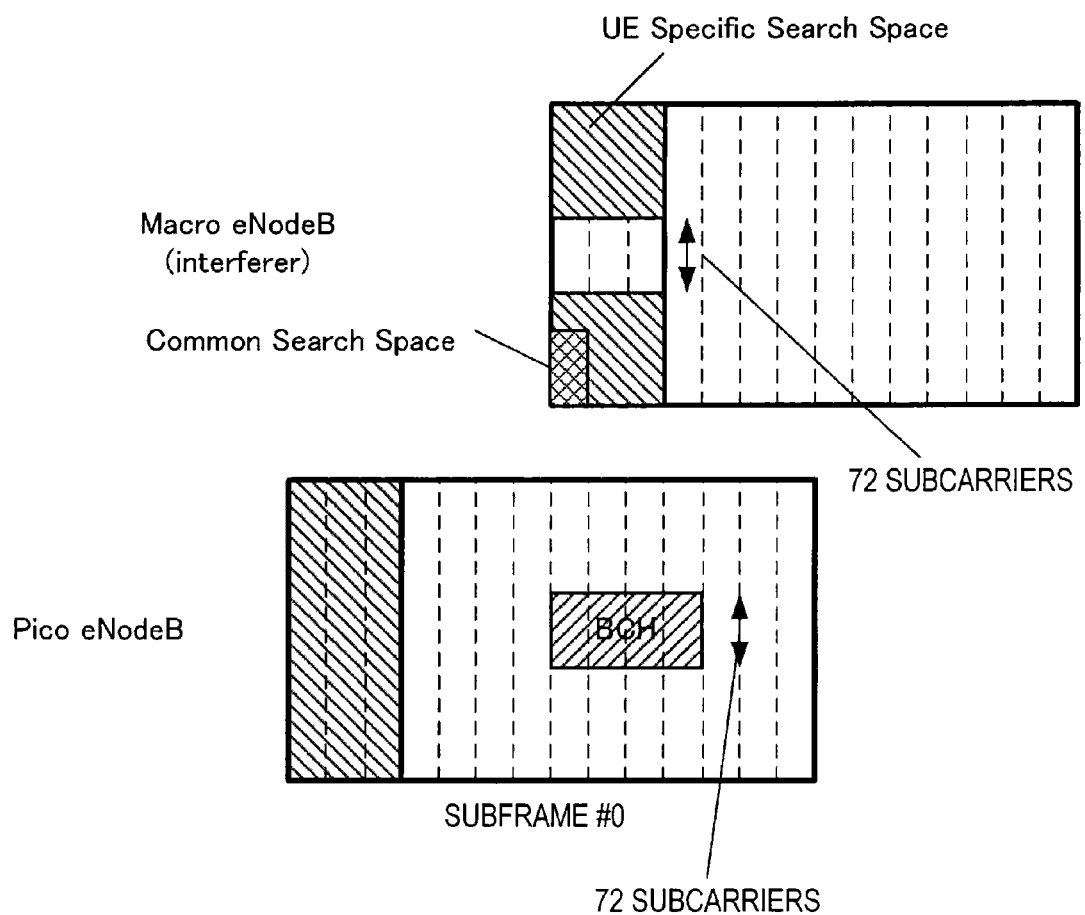
FIG. 12 is a figure illustrating a manner that when Macro eNodeB selects a bandwidth of 20 MHz, a common search space is sequentially placed from the beginning of CCE as skipping the central 72 subcarriers.

The region of the common search space requires 576 subcarriers from the first OFDM symbol, from the lower frequency (described above). Since the number of subcarriers when Macro eNodeB selects the 20 MHz bandwidth is 1201 (see Table 1), when the common search space is sequentially placed from the beginning of CCE, Means 3-2 enables to use the common search space because it does not reach to the central 72 subcarriers as illustrated in FIG. 12.

Thus, in Means 3-3, when Macro eNodeB selects 20 MHz bandwidth, common search space can be used, and when bandwidth equal to or lower than 15 MHz is selected, the common search space is not used, that is, the position of common search space of PDCCH of Macro eNodeB is restricted according to the bandwidth.

Means 3-4:

In the method to sequentially place the common search space from the beginning of CCE according to Means 3-2, when a bandwidth equal to or lower than 15 MHz is selected, the common search space cannot be sequentially placed as skipping the central 72 subcarriers.

Figure 13:
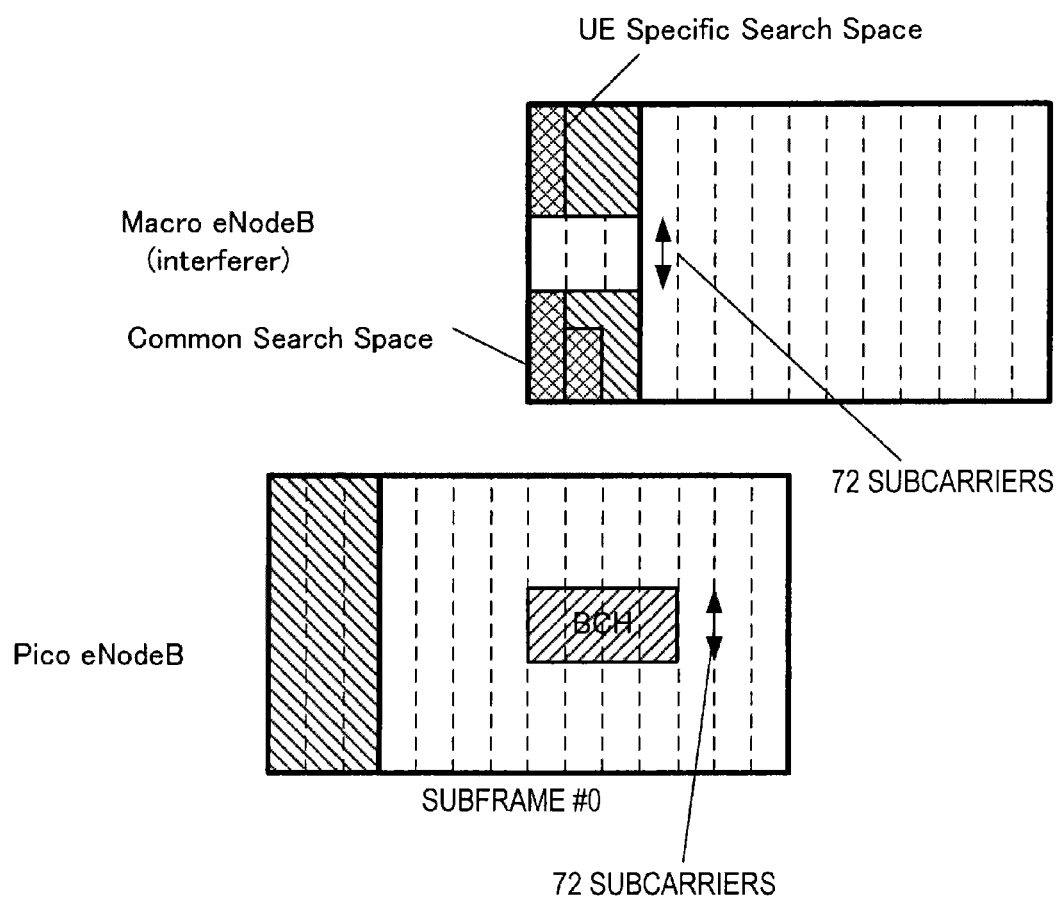
FIG. 13 is a figure illustrating a manner that common search space is placed as skipping the central 72 subcarriers.

Then, as illustrated in FIG. 13, Means 3-4 allows to place the common search space as skipping the central 72 subcarriers. Although the user equipment of Macro eNodeB sequentially performs blind decoding the common search space and CRC error occurs when decoding CCE in the central 72 subcarrier part, the calculation cost does not become an issue. With this method, Macro eNodeB can use the common search space in a bandwidth equal to or lower than 15 MHz as using first to third OFDM symbols as PDCCH while restricting interference to BCH of Pico eNodeB.

Means 3-5: Combination of Means 3-1 and Means 3-2

Means 3-1 is a method to avoid interference without using a later half of PDCCH, and Means 3-2 is a method to restrict the range of UE Specific search space of PDCCH. On the other hand, as illustrated in FIGS. 27 to 29, the subframes to which BCH, PSS, and SSS are inserted are scattered in the radio frame, that is, interference has to be avoided at plural subframe positions in the radio frame. Instead of using one of Means 3-1 and Means 3-2, Means 3-1 and Means 3-2 may be combined as Means 3-5 in the entire radio frame.

Figure 14:
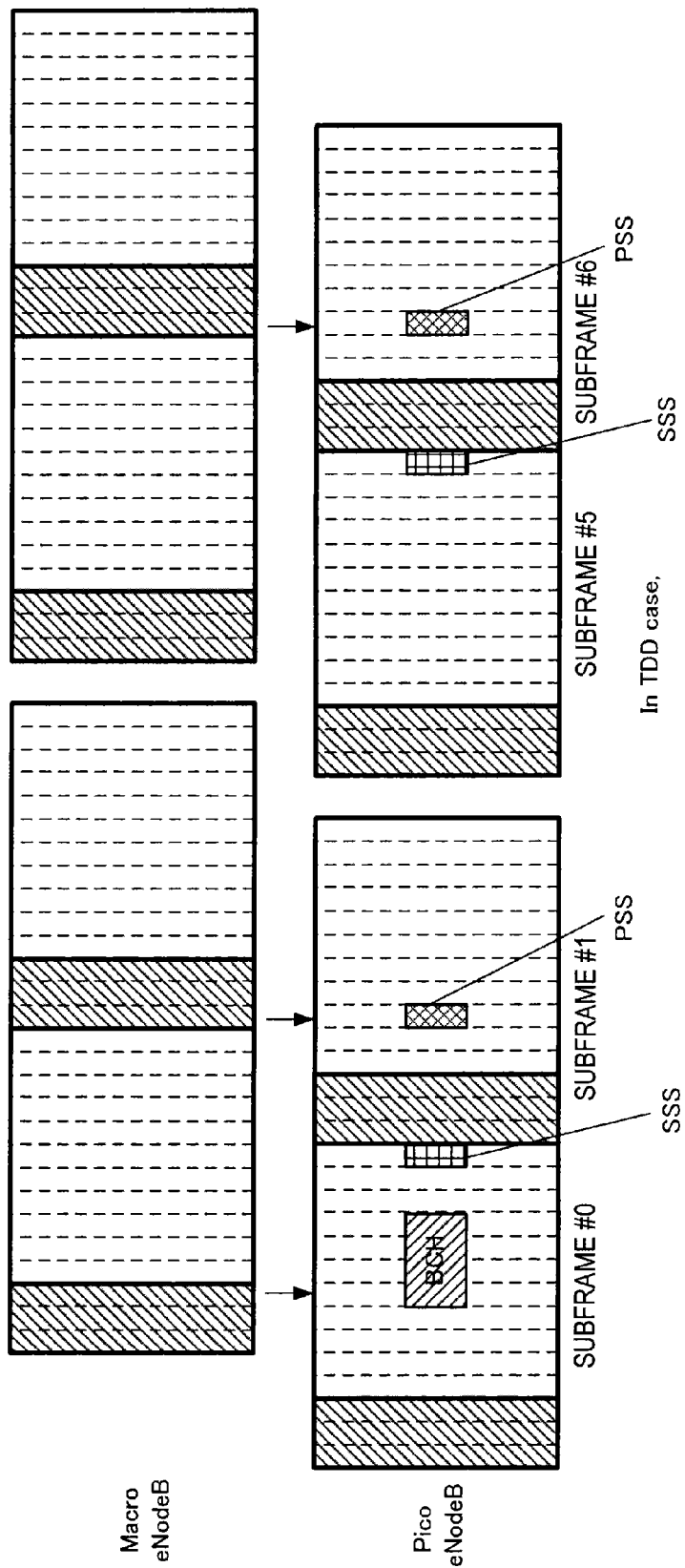
FIG. 14 is a figure illustrating a manner that PDCCH of Macro eNodeB interferes with BCH, PSS and SSS of Pico eNodeB in a case of TDD mode.
Figure 15:
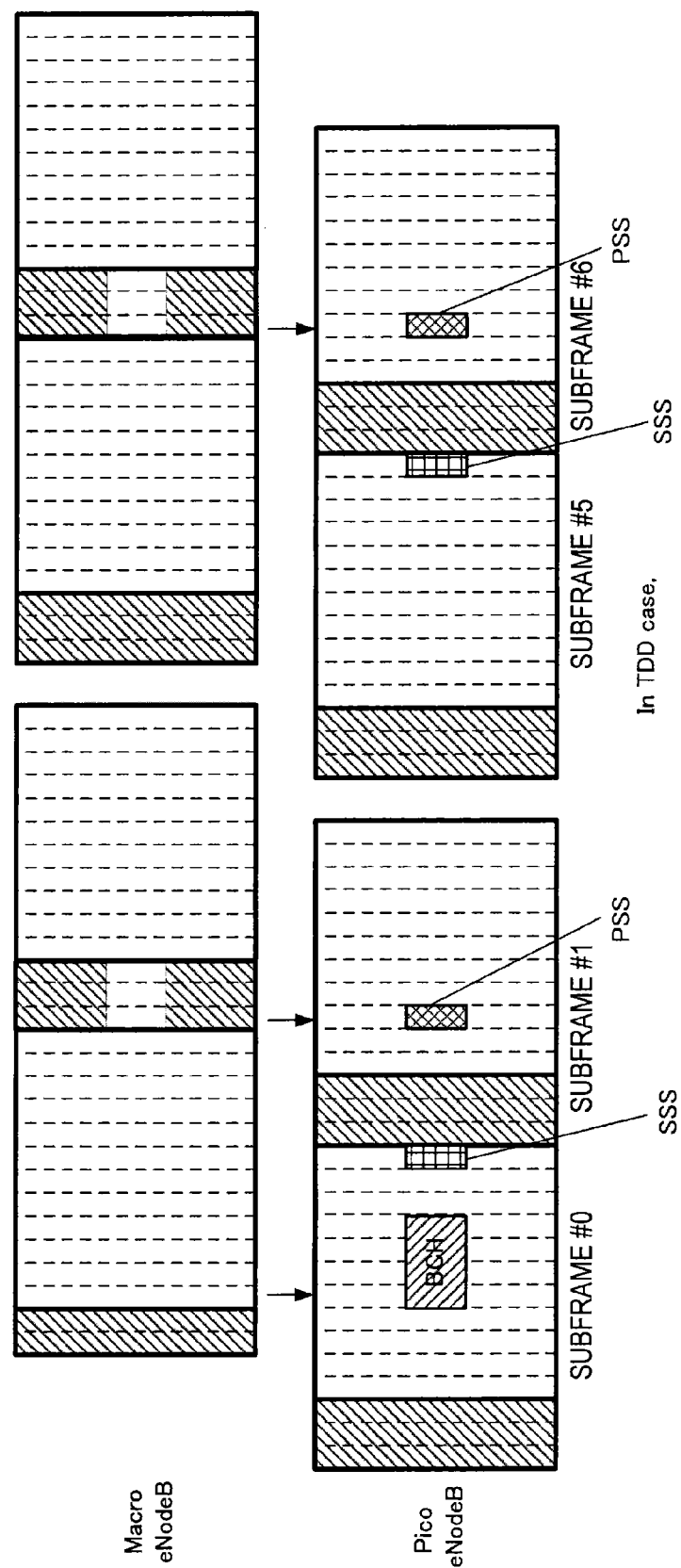
FIG. 15 is a figure illustrating a manner to avoid the interference of PDCCH of Macro eNodeB given to BCH, PSS and SSS of Pico eNodeB illustrated in FIG. 14 in a combination of different method.

Means 3-5 will be explained using a case of TDD mode. Here, it is assumed that the interference of PDCCH of Macro eNodeB given to BCH, PSS and SSS of Pico eNodeB is a case illustrated in FIG. 14. For example, as illustrated in FIG. 15, using the method of Means 3-1, in subframe #0, when the third OFDM symbol of PDCCH of Macro eNodeB is changed to PDSCH, interference with BCH and SSS of Pico eNodeB can be avoided by Rel-8 ICIC. Further, in subframes #1 and #6, using the method of Means 3-2, interference to PSS of Pico eNodeB can be avoided when Macro eNodeB places the search space as skipping the central 72 subcarriers.

The method of Means 3-1 can be also applied to a user equipment compliant with Rel-8. On the other hand, when the method of Means 3-2 is used, like in the legacy user equipment compliant with Rel-8, a user equipment, which is not corresponding to the search space placement as skipping the central 72 subcarriers, has a disadvantage that unnecessary blind decoding is performed on the central 72 subcarriers where the search space is not placed and this may cause a CRC error. It is thus preferable to use Means 3-1.

Figure 16:
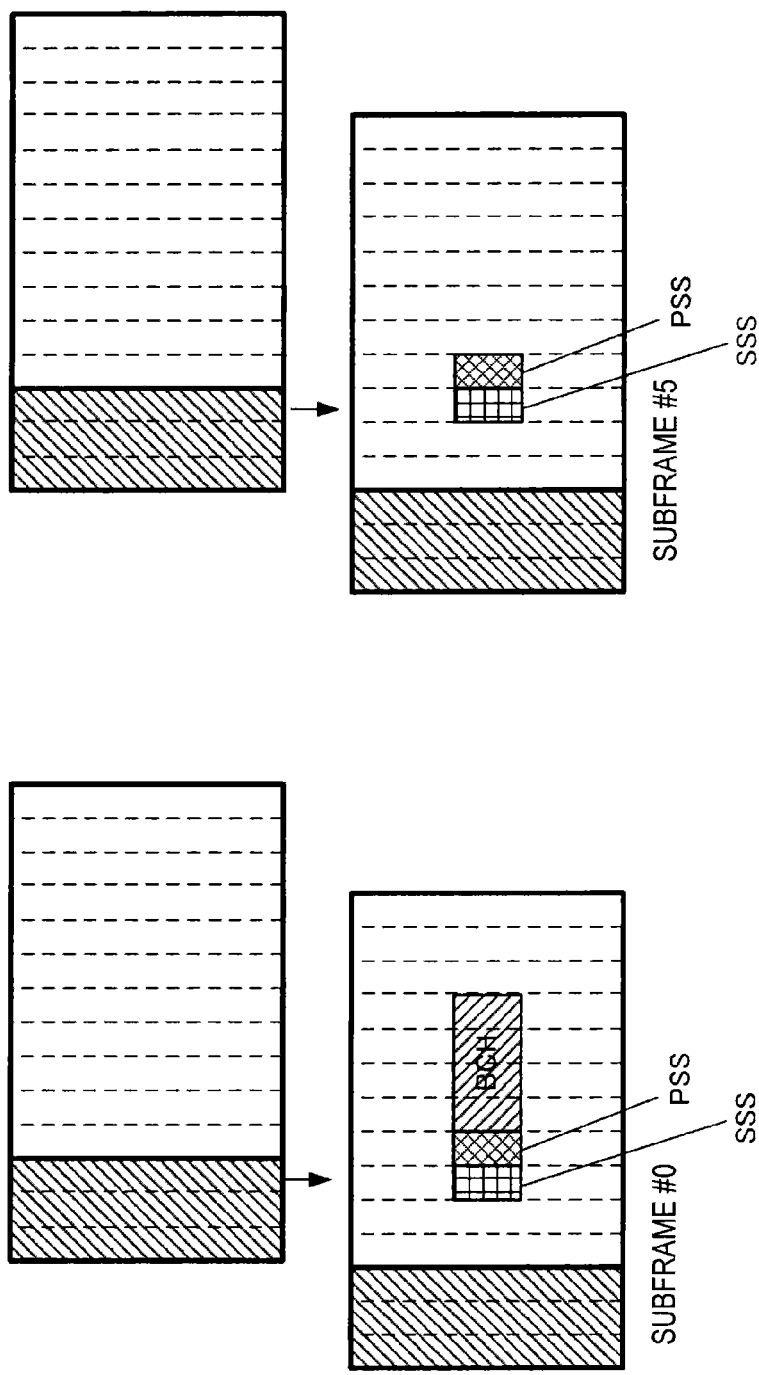
FIG. 16 is a figure illustrating a manner that PDCCH of Macro eNodeB interferes with BCH, PSS and SSS of Pico eNodeB in a case of FDD mode.

Means 3-6: Method for Using the Method for Restrict Search Space Only for Particular Subframe FIG. 14 illustrates a manner of interference in TDD mode. On the other hand, FIG. 16 illustrates a manner that PDCCH of Macro eNodeB interferes with BCH, PSS and SSS of Pico eNodeB in FDD mode. Comparing FIG. 14 with FIG. 16, the subframes to be considered interference thereof (in other words, the subframes to which BCH, PSS and SSS are inserted) are subframes #0, #1, #5 and #6 in TDD and subframes #0 and #5 in FDD.

The above described Means 3-1 to 3-4 are methods to avoid interference by restricting the PDCCH region of Macro eNodeB. Thus, there is a problem that the PDCCH region of Macro eNodeB may be unnecessarily reduced when restriction is uniformly applied to the PDCCH region including other subframes which are not required to be considered interference to their BCH, PSS and SSS. Then, regardless of applying any one of Means 3-1 to 3-4, it is preferable to restrict the subframe, to which those Means are applied, to the subframes which overlap with the subframes #0, #1, #5 and #6 in Pico eNodeB in TDD. Similarly, in FDD, it is preferable to restrict the subframes, to which those Means are applied, to the subframes which overlap with the subframes #0 and #5 in the side of Pico eNodeB.

Figure 19:
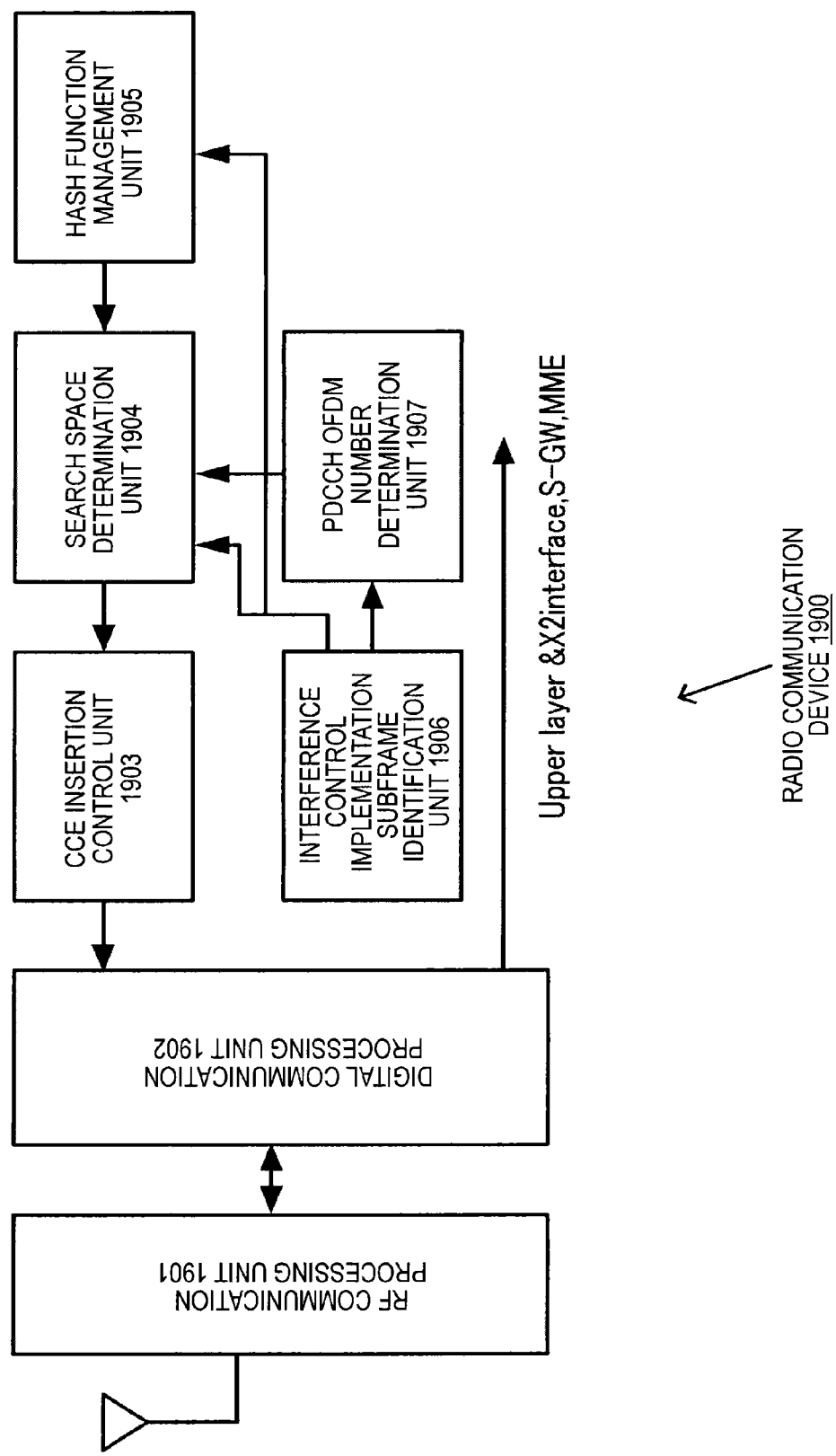
FIG. 19 is a figure schematically illustrating a configuration example of a radio communication device 1900 that operates as Macro eNodeB.

FIG. 19 schematically illustrates a configuration example of a radio communication device 1900, which operates as Macro eNodeB that realizes each means for the above Problem 3.

The radio communication device 1900 includes an RF communication processing unit 1901 which performs an analog process of a radio signal transmitted and received via an antenna, and a digital communication processing unit 1702 which modulates a digital transmission signal and demodulates a digital reception signal. The digital communication processing unit 1902 exchanges transmission and reception data in an upper layer protocol of a communication layer of the device 1900. Further, the digital communication processing unit 1902 communicates with another eNodeB via an X2 interface, S-GW, and MME.

An interference control implementation subframe identification unit 1906 identifies a subframe which interference to pico cell in the own cell has to be avoided. Concretely, based on offset of the subframe with Pico eNodeB, a subframe position in the own cell which interferes with important signals such as BCH, PSS and SSS transmitted from Pico eNodeB is identified. A PDCCH OFDM number determination unit 1907 determines the number of OFDM symbols used for PDCCH in each subframe, according to whether the subframe is identified, by the interference control implementation subframe identification unit 1906, as a subframe which interference has to be controlled. Concretely, the PDCCH OFDM number determination unit 1907 reduces the number of OFDM symbols used for PDCCH to avoid interference.

The hash function management unit 1905 determines a hash function used in each subframe, according to whether the subframe is identified, by the interference control implementation subframe identification unit 1906, as a subframe which interference is controlled. A search space determination unit 1904 determines the location of UE specific search space of each user equipment which is entering the own cell by using a hash function stored in hash function management unit 1905, as considering whether the subframe is identified, by the interference control implementation subframe identification unit 1906, as a subframe which interference is controlled. Concretely, the search space determination unit 1904 places a common search space from the CCE of the beginning and determines the location of a UE specific search space of each user equipment, as considering that the number of OFDM symbols to be used for PDCCH is reduced and the central 72 subcarriers are skipped in order to avoid interference. Then, a CCE insertion control unit 1703 controls an insertion of each CCE into PDCCH based on the determined specific search space.

Figure 20:
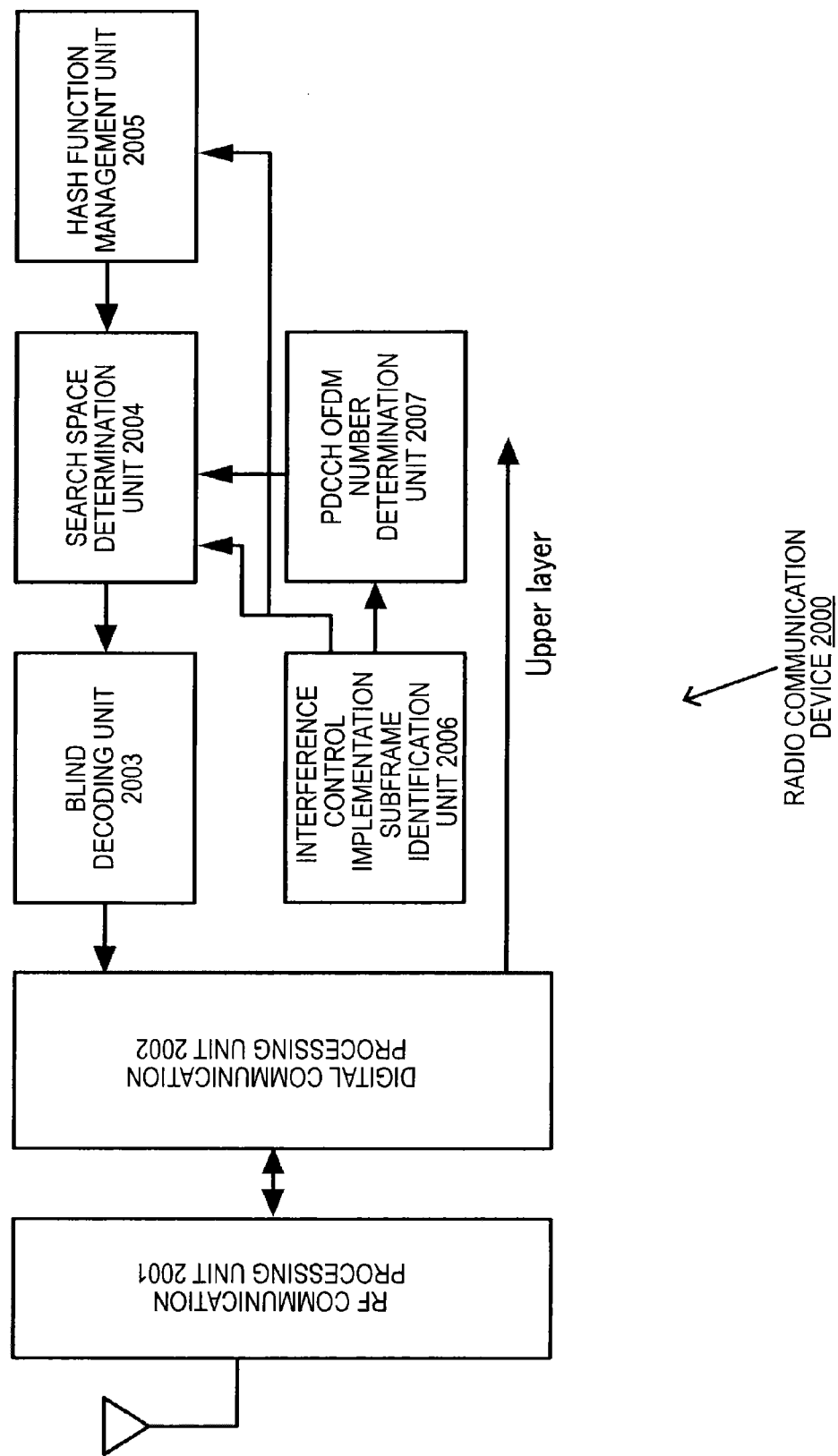
FIG. 20 is a figure schematically illustrating a configuration example of a radio communication device 2000 that operates as a user equipment belonging to Macro eNodeB.

Further, FIG. 20 schematically illustrates a configuration example of a radio communication device 2000 that operates as a user equipment belonging to Macro eNodeB illustrated in FIG. 19.

The radio communication device 2000 includes an RF communication processing unit 2001 which performs an analog process of a radio signal transmitted and received via an antenna, and a digital communication processing unit 2002 which modulates a digital transmission signal and demodulates a digital reception signal. The digital communication processing unit 2002 transmits and receives transmission and reception data in an upper layer protocol of a communication layer of the device 2000.

An interference control implementation subframe identification unit 2006 identifies a subframe which interference to pico cell in the own cell has to be avoided. Concretely, based on offset of the subframes of Macro eNodeB and Pico eNodeB, a subframe position in the own cell which interferes with important signals such as BCH, PSS and SSS transmitted from Pico eNodeB is identified. A PDCCH OFDM number determination unit 2007 determines the number of OFDM symbols to be used for PDCCH in each subframe according to whether the subframe is identified to control its interference by the interference control implementation subframe identification unit 2006. Concretely, the PDCCH OFDM number determination unit 2007 determines the number of OFDM symbols for PDCCH, which is to be reduced to avoid interference.

A hash function management unit 2005 determines a hash function to be used in each subframe according to whether the subframe is identified to control its interference by the interference control implementation subframe identification unit 2006. A search space determination unit 2004 determines a location of a search space. Further, the search space determination unit 2004 determines the location of the UE Specific search space of the own terminal by using the hash function stored in the hash function management unit 2005, as considering whether the subframe is identified to control its interference by the interference control implementation subframe identification unit 2006. Then, the blind decoding unit 2003 performs blind decoding on PDCCH of Macro eNodeB based on the determined UE specific search space.

Problem 4: There is a case that it is difficult to detect a shift in synchronization between Macro eNodeB and Pico eNodeB. This is caused by that the communication speed and communication capacity of the X2 interface between eNodeBs are not enough. Further, in a case such as Home eNodeB, a simple synchronization detection methods required since it is assumed an appearance and a disappearance of cells frequently happen.

The user equipment generally synchronizes with a single eNodeB. In such a case, even when the user equipment tries to receive a signal from another eNodeB, a CRS of another eNodeB cannot be received at the same time since a CRS signal as a reference signal is set to be a different signal. Thus, a conventional user equipment cannot measure a shift of timing between two eNodeBs.

Here, in order to allow to detect synchronization between eNodeBs, a design is modified so that the user equipment can measure a shift of timing between two eNodeBs. In other words, in a condition being synchronized with eNodeB_1, the user equipment synchronizes with eNodeB_2 and obtains a frame synchronization position of eNodeB_2 as maintaining a counter of a frame synchronization position of eNodeB_1. Then, the frame synchronization position of eNodeB_2 is compared with the frame synchronization position of eNodeB_1, which is calculated based on the above mentioned internal counter that keeps counting, and a value of a shift of timing between eNodeBs is obtained. After that, the user equipment resynchronizes with eNodeB_1 to be an original condition and informs the obtained value of shifted timing to NodeB_1. Here, when PSS is being interfered, there is no problem although it is a condition that synchronizing with eNodeB_1 is not easy for the user equipment and it takes time to obtain synchronization since SN basically improves as keeping repeatedly receiving.

There is a problem that, when synchronization position of newly activated pico cell is shifted, it is difficult to receive information of BCH, PSS and SSS from the beginning and the user equipment cannot be in a condition of RRC_Connected with eNodeB. Basically, when Pico eNodeB is suddenly activated, Pico eNodeB has smaller power so that there is little influence on the cell of Macro eNodeB. There is a problem that the user equipment in the area of a range expansion of Pico eNodeB cannot enter the cell of Pico eNodeB.

What becomes a problem in the first phase is only that the user equipment in the area of the range expansion. Since a terminal close to Pico eNodeB can enter the cell of Pico eNodeB, the terminal obtains a shift of timing by using the above synchronization detection method and informs Pico eNodeB. On the other hand, Pico eNodeB informs the informed value to Macro eNodeB with a signal via X2 interface and the like. With this, Macro eNodeB can recognize the shift in synchronization with Pico eNodeB and take the above means corresponding to Problem 3.

The reason that the Pico eNodeB does not change its frame timing when Pico eNodeB recognizes the shift amount is that there is a user equipment that is already in its cell. Even when there is no user equipment being RRC_Connected, there is a possibility that there is a terminal waiting for paging in RRC_Idle Mode and it is considered that the frame timing should not be changed during the process.

Figure 21:
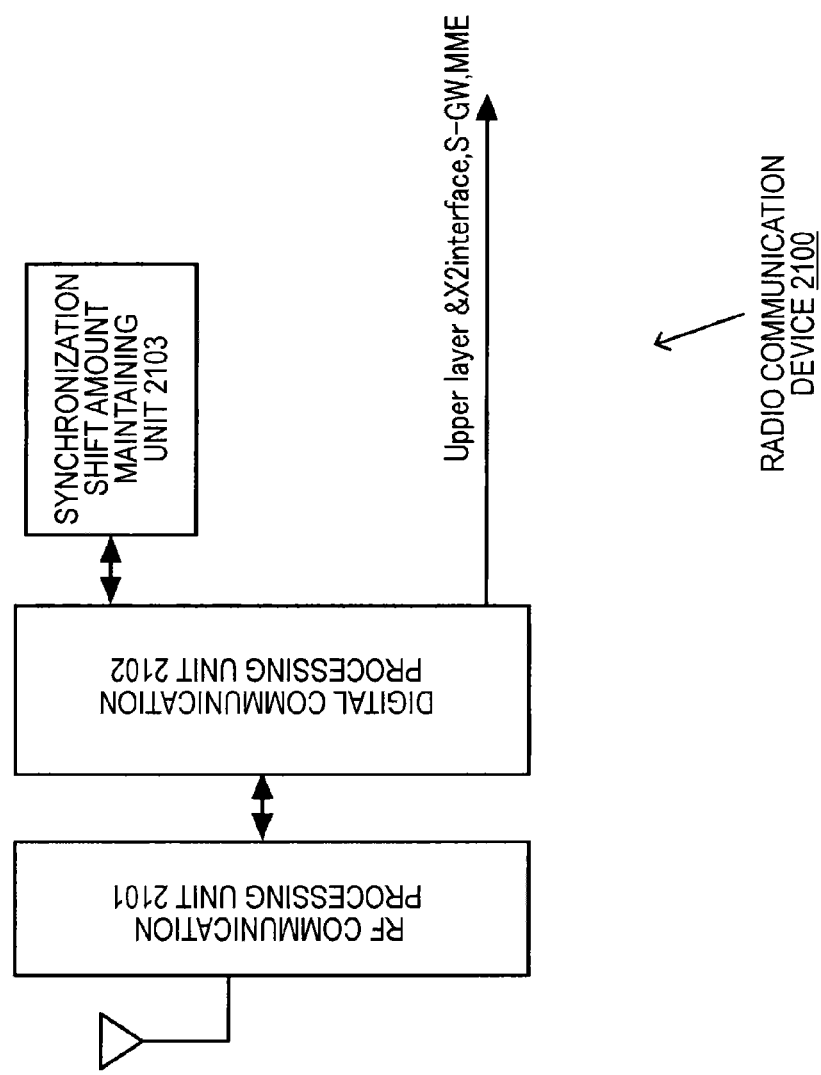
FIG. 21 is a figure schematically illustrating a configuration example of a radio communication device 2100 that operates as Macro eNodeB.

FIG. 21 schematically illustrates a configuration example of a radio communication device 2100 that operates as Macro eNodeB that realizes each means for above Problem 4.

The radio communication device 2100 includes an RF communication processing unit 2101 which performs an analog process of a radio signal transmitted and received via an antenna, and a digital communication processing unit 2102 which modulates a digital transmission signal and demodulates a digital reception signal. The digital communication processing unit 2102 exchanges transmission and reception data in an upper layer protocol of a communication layer of the device 2100. Further, the digital communication processing unit 2102 communicates with another eNodeB via the X2 interface, S-GW, and MME.

A synchronization shift amount maintaining unit 2103 maintains a synchronization shift amount with an adjacent Pico eNodeB, which is informed from a user equipment in its own cell.

Figure 22:
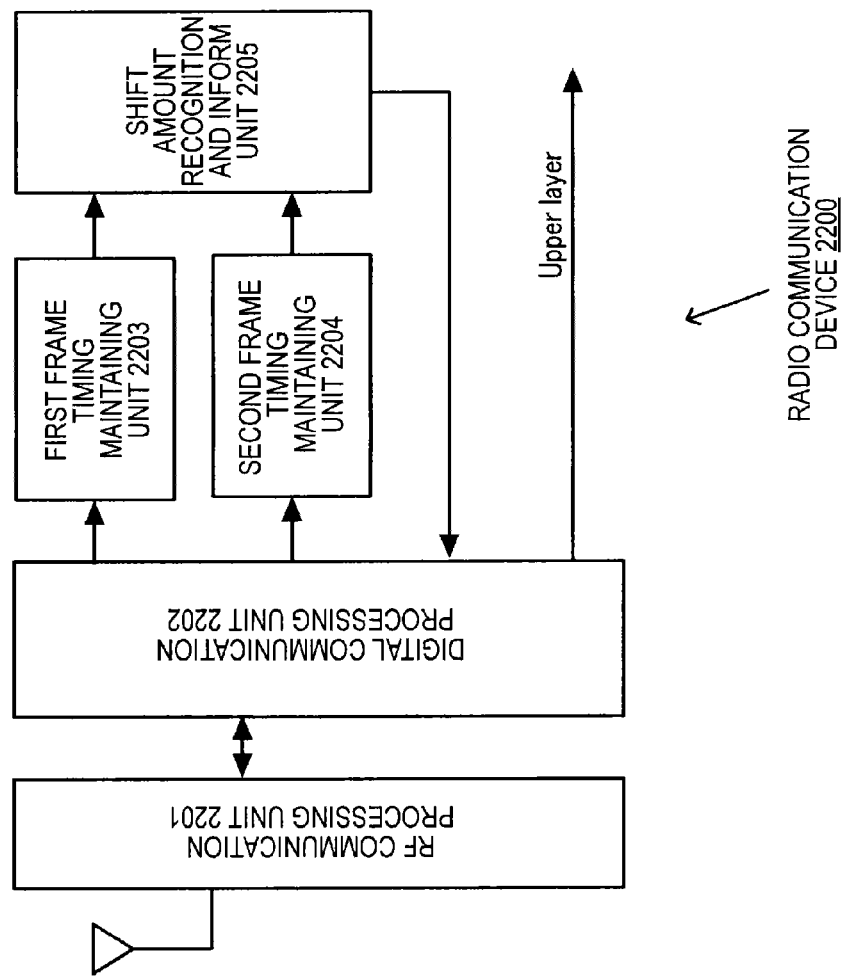
FIG. 22 is a figure schematically illustrating a configuration example of a radio communication device 2200 that operates as a user equipment belonging to Macro eNodeB.

Further, FIG. 22 schematically illustrates a configuration example of a radio communication device 2100 that operates as a user equipment belonging to Macro eNodeB illustrated in FIG. 21.

The radio communication device 2200 includes an RF communication processing unit 2201 that performs an analog process of a radio signal transmitted and received via an antenna, and a digital communication processing unit 2202 which modulates a digital transmission signal and demodulates a digital reception signal. The digital communication processing unit 2202 exchanges transmission and reception data in the upper layer protocol of a communication layer of the device 2200. The digital communication processing unit 2202 detects synchronization of eNodeB based on synchronization signals PSS and SSS included in a downlink subframe from eNodeB.

A first frame timing maintaining unit 2203 maintains a counter for counting frame synchronization positions when synchronizing with Macro eNodeB. Further, a second frame timing maintaining unit 2204 maintains a counter for counting frame synchronization positions when synchronizing with Pico eNodeB.

Then, a shift amount recognition and inform unit 2205 compares the frame synchronization position of Pico eNodeB maintained in the second frame timing maintaining unit 2204 with the frame synchronization position of Macro eNodeB maintained in the first frame timing maintaining unit 2203 and obtains a value of a timing shift between eNodeBs. After that, when resynchronizing with Macro eNodeB and returns to be in an original condition, the shift amount recognition and inform unit 2205 informs the obtained value of a timing shift to Macro eNodeB using PDSCH.

Figure 23:
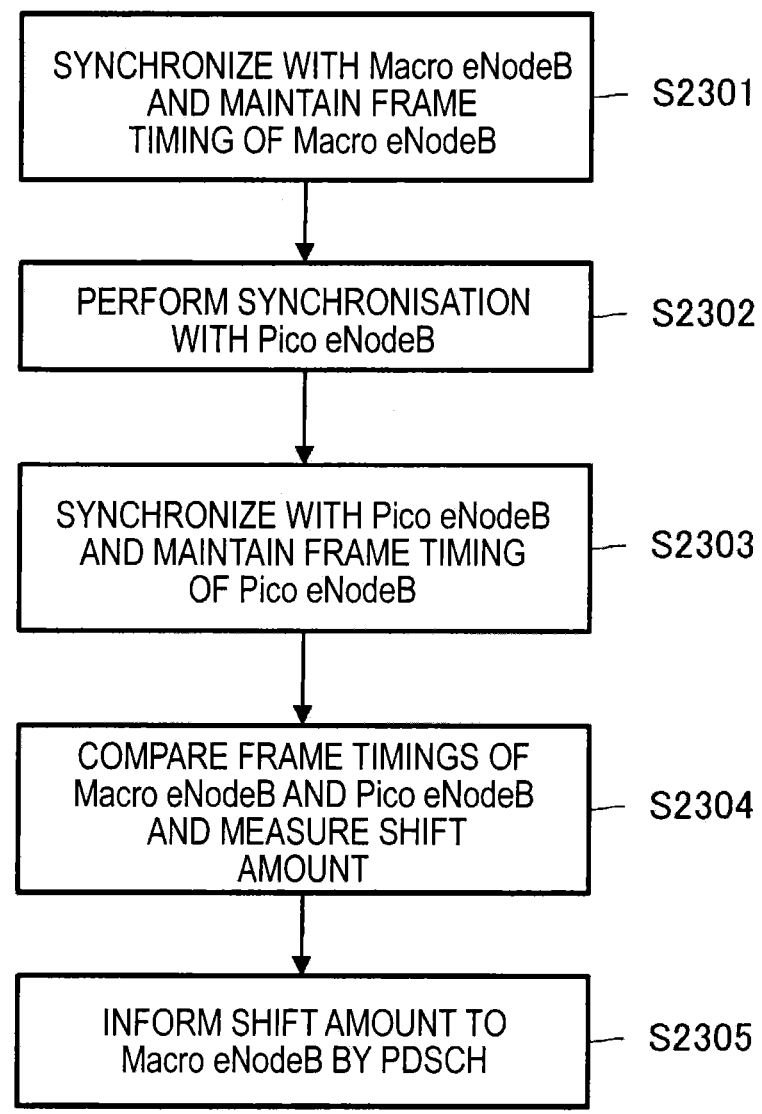
FIG. 23 is a flowchart illustrating an operation procedure of the radio communication device 2100 that operates as the user equipment belonging to Macro eNodeB.
Figure 24:
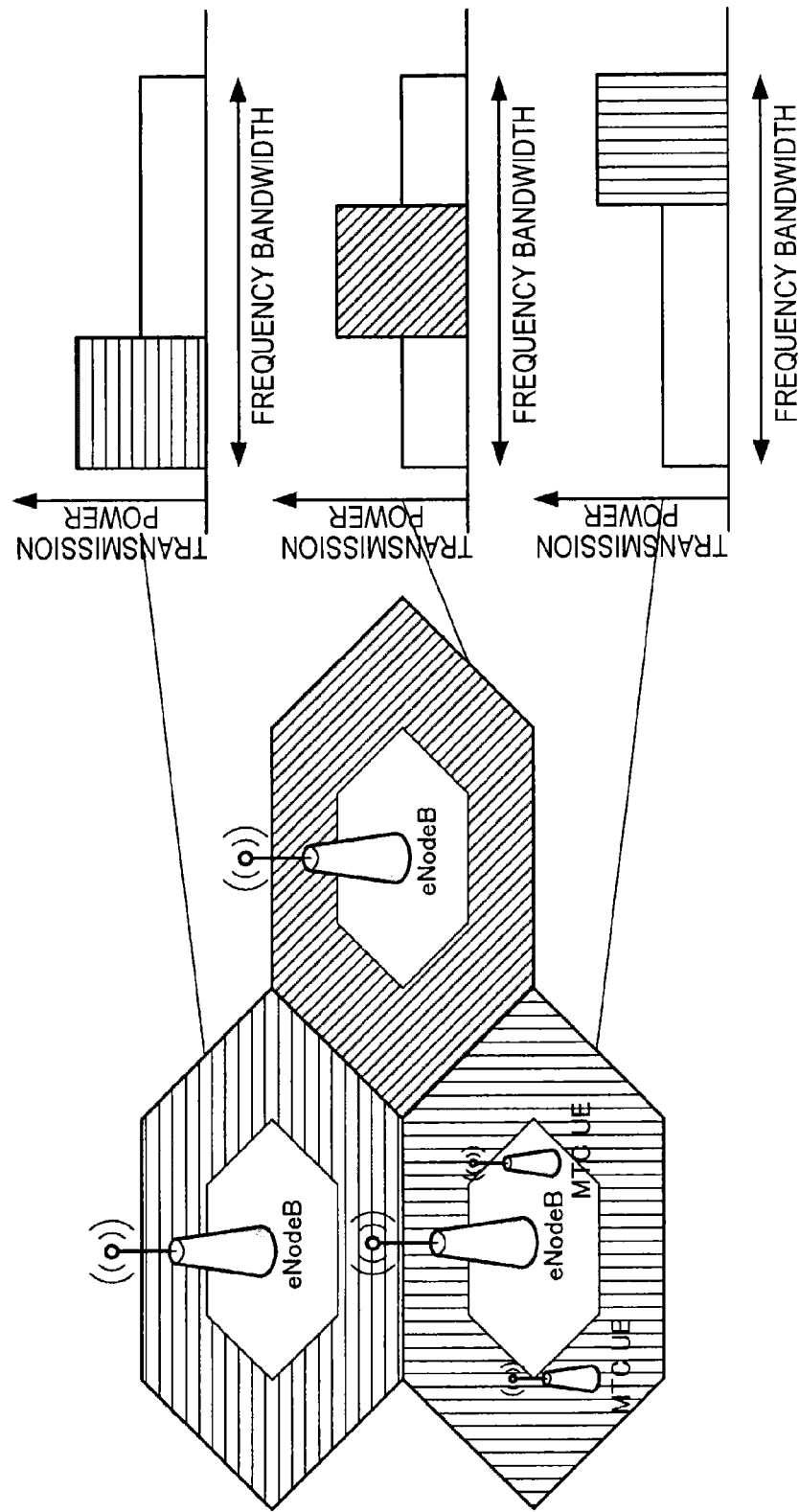
FIG. 24 is a figure illustrating a manner that three cells of cell 1 to 3 that a fractional frequency reuse is performed are adjacent to each other.

FIG. 23 illustrates, in a form of a flowchart, an operation procedure of the radio communication device 2100 that operates as the user equipment belonging to Macro eNodeB.

Firstly, when synchronizing with Macro eNodeB, the frame timing of Macro eNodeB is maintained in the first frame timing maintaining unit 2203 (step S2301).

Then, synchronization with Pico eNodeB is performed (step S2302).

Then, synchronization with Macro eNodeB is performed again as maintaining the frame timing of Pico eNodeB in second frame timing maintaining unit 2204 (step S2303).

Then, the shift amount recognition and inform unit 2205 compares the frame synchronization position of Pico eNodeB maintained in the second frame timing maintaining unit 2204 with the frame synchronization position of Macro eNodeB maintained in the first frame timing maintaining unit 2203, and measures a timing shift amount between eNodeBs (step S2304).

Then, the shift amount recognition and inform unit 2205 informs the measured shift amount to Macro eNodeB using PDSCH (step S2305).

As described above, according to the technique disclosed in this specification, throughput can be improved since a problem of interference between base stations having cells in different sizes can be efficiently solved.

Here, the technique disclosed in this specification may be given in the following configurations.

(1) A radio communication device configured to place control information included in a beginning of a downlink subframe, which is transmitted from the device as a base station, in a frequency band separated from control information of downlink subframe transmitted from an adjacent base station as synchronizing.

(2) The radio communication device according to (1), in which the control information is placed in a band including a predetermined position when common control information which is specified to be sequentially placed from the predetermined position and addressed to all terminals in a cell of the device is included, and the control information is placed in a band which does not include the predetermined position when the common control information is not included.

(3) The radio communication device according to (2), in which the device does not include the common control information to the control information when the adjacent base station includes the common control information.

(4) The radio communication device according to (2), in which, when the common control information is included, the common control information is sequentially placed from the predetermined position and control information of each terminal in the cell of the device is placed in a band separated from the adjacent base station; and when the common control information is not included, control information of each terminal in the cell of the device is placed in a band separated from the adjacent base station as skipping a region where the adjacent base station places the common control information.

(5) The radio communication device according to (1), in which plural bands with different bandwidths can be selected to use; and a band with a bandwidth larger than that of the adjacent base station is selected when a cell radius is larger than that of the adjacent base station, and a band with a bandwidth smaller than that of the adjacent base station is selected when the cell radius is smaller than that of the adjacent base station.

(6) The radio communication device according to (5), in which, when a band with a bandwidth larger than that of the adjacent base station is selected, the control information of the cell of the device is placed as skipping the frequency band where the adjacent base station places the control information.

(7) The radio communication device according to (5), in which, when a band with a bandwidth larger than that of the adjacent base station is selected and common control information, which is specified to be sequentially placed from a predetermined position and addressed to all terminals in the cell of the device, is included, the common control information is sequentially placed from the predetermined position as skipping the frequency band where the adjacent base station places the control information.

(8) The radio communication device according to (5), in which, when a band with a bandwidth lager than that of the adjacent base station is selected and common control information which is specified to be sequentially placed from a predetermined position and is addressed to all terminals in the cell of the device, is included, the common control information is sequentially placed from the predetermined position including the frequency band where the adjacent base station places the control information.

(9) The radio communication device according to (8), in which, when a band with a bandwidth smaller than that of the adjacent base station is selected, control information for each terminal in the cell of the device is placed as skipping the region where the adjacent base station sequentially places the common control information from the predetermined position.

(10) A radio communication device configured to place control information included in a beginning of a downlink subframe, which is transmitted from the device as a base station, as skipping a frequency band which overlaps with a particular signal included in a user information area of a downlink subframe which an adjacent base station transmits as causing a time lag.

(11) The radio communication device according to (10), in which interference with the user information area in a subframe can be eliminated via a predetermined communication interface between base stations; and among control information included in a beginning of a downlink subframe of a cell of the device, a frequency band which overlaps with a particular signal included in the user information area of the downlink subframe which the adjacent base station transmits as causing a time lag is changed to a user information area.

(12) The radio communication device according to (10), in which the control information is placed at a beginning of the downlink subframe of a cell of the device, as skipping a frequency band which overlaps with a particular signal included in the user information area of the downlink subframe which the adjacent base station transmits as causing a time lag.

(13) The radio communication device according to (12), in which a calculation method is applied to calculate a location where to place control information for each terminal in the cell of the device as skipping the frequency band which overlaps with the particular signal included in the user information area of the downlink subframe which the adjacent base station transmits as causing a time lag.

(14) The radio communication device according to (12), in which plural bands of different bandwidths can be selected to use; and in a case that common control information addressed to all terminals in the cell of the device is sequentially placed from the predetermined position according to a specification and, since a band having a bandwidth equal to or lower than a predetermined bandwidth is selected, the band reaches to a frequency band which overlaps with the particular signal included in the user information area of the downlink subframe which the adjacent base station transmits as causing a time lag, the common control information is not used, and in a case that a band with a bandwidth greater than the predetermined bandwidth is selected, the common control information can be used.

(15) The radio communication device according to (12), in which plural bands of different bandwidths can be selected to use; and in a case that common control information addressed to all terminals in the cell of the device is sequentially placed from a predetermined position according to a specification and, since a band having a bandwidth equal to or lower than a predetermined bandwidth is selected, the band reaches to the frequency band which overlaps with the particular signal included in the user information area of the downlink subframe which the adjacent base station transmits as causing a time lag, the common control information is sequentially placed from the predetermined position as skipping the frequency band which overlaps with the particular signal.

(16) The radio communication device according to (10), in which, in a first downlink subframe of a cell of the device, among control information included in the beginning, a frequency band which overlaps with a particular signal included in a user information area of a downlink subframe which the adjacent base station transmits as causing a time lag is changed to a user information area; and, in a second downlink subframe of the cell of the device, the control information is placed as skipping the frequency band which overlaps with the particular signal included in the user information area of the downlink subframe which the adjacent base station transmits as causing a time lag.

(17) The radio communication device according to (10), in which, when the device as a base station transmits a downlink radio frame, which is composed of plural subframes, a placement as skipping a frequency band which overlaps with a particular signal is performed only to a subframe which overlaps with the subframe in which the adjacent base station includes the particular signal in the user information area.

(18) A radio communication device including: a synchronization detecting unit configured to operate as a terminal and detect synchronization with a base station; a first frame timing maintaining unit configured to maintain information of a frame synchronization position when synchronizing with a first base station; a second frame timing maintaining unit configured to maintain information of a frame synchronization position when synchronizing with a second base station; and a shift amount recognition and inform unit configured to recognize a shift amount in synchronization by comparing the frame synchronization position maintained in the first frame timing maintaining unit and the frame synchronization position maintained in the second frame timing maintaining unit, and inform the recognized shift amount in synchronization to the first base station when resynchronizing with the first base station.

(19) A radio communication method including: a step for placing control information included in a beginning of a downlink subframe, which is transmitted from the device as a base station, in a frequency band separated from control information of a downlink subframe transmitted by an adjacent base station as synchronizing; and a step for transmitting the downlink subframe.

(20) A radio communication method including: a step for placing control information included in a beginning of a downlink subframe, which is transmitted from the device as a base station, as skipping a frequency band which overlaps with a particular signal included in a user information area of a downlink subframe which an adjacent base station transmits as causing a time lag; and a step for transmitting the downlink subframe.

(21) A radio communication method including: a first frame timing maintaining step for detecting synchronization with a first base station and maintaining information of its frame synchronization position; a second frame timing maintaining step for detecting synchronization with a second base station and maintaining information of its frame synchronization position; a shift amount recognizing step for recognizing a shift amount in synchronization by comparing the frame synchronization position maintained in the first frame timing maintaining step and the frame synchronization position maintained in the second frame timing maintaining step; and a shift amount informing step for resynchronizing with the first base station and informing the recognized shift amount in synchronization to the first base station.

(22) A radio communication system including: a first base station having a first cell having a first cell radius; and a second base station having a second cell having a second cell radius smaller than the first cell radius and existing in the first cell. In the first base station places control information, which is included in a beginning of a downlink subframe, in a frequency band which is separated from control information of a downlink subframe which the second base station transmits as synchronizing.

(23) A radio communication system including: a first base station having a first cell having a first cell radius; and a second base station having a second cell having a second cell radius smaller than the first cell radius and existing in the first cell. The first base station places control information, which is included in a beginning of a downlink subframe, as skipping a frequency band which overlaps with a particular signal included in a user information area of a downlink subframe which the second base station transmits as causing a time lag.

(24) A radio communication system including: a first base station having a first cell having a first cell radius; a second base station having a second cell having a second cell radius smaller than the first cell radius and existing in the first cell; and one or more terminals. At least one terminal maintains information of a frame synchronization position when synchronizing with each base station, recognizes a shift amount by comparing a frame synchronization position of the first base station and a frame synchronization position of the second base station, and informs the shift amount to the first base station via an uplink when resynchronizing with the first base station.

INDUSTRIAL APPLICABILITY

The technique disclosed in this specification has been explained in detail with reference to the specific embodiments. However, it is obvious that person skilled in the art may achieve a modification or substitution of the embodiments within the scope of the technique disclosed in this specification.

This specification has been mainly explaining embodiments applied to a cellular communication system applicable with LTE developed by 3GPP; however, the scope of the technique disclosed in this specification is not limited to the embodiments. The technique disclosed in this specification can be similarly applied to various cellular communication systems in which cells having different sizes are layered.

In short, the present technique has been disclosed as a manner of examples and the descriptions of this specification should not be limitedly understood. Claims should be carefully considered to determine the scope of the present technique.

REFERENCE SIGNS LIST

1700 Radio communication device
1701 RF communication processing unit
1702 Digital communication processing unit
1703 CCE insertion control unit
1704 Search space determination unit
1705 Hash function storage unit
1800 Radio communication device
1801 RF communication processing unit
1802 Digital communication processing unit
1803 Blind decoding unit
1804 Search space determination unit
1805 Hash function storage unit
1900 Radio communication device
1901 RF communication processing unit
1902 Digital communication processing unit
1903 CCE insertion control unit
1904 Search space determination unit
1905 Hash function management unit
1906 Interference control implementation subframe identification unit
1907 PDCCH OFDM number determination unit
2000 Radio communication device
2001 RF communication processing unit
2002 Digital communication processing unit
2003 Blind decoding unit
2004 Search space determination unit
2005 Hash function management unit
2006 Interference control implementation subframe identification unit
2007 PDCCH OFDM number determination unit
2100 Radio communication device
2101 RF communication processing unit
2102 Digital communication processing unit
2103 Synchronization shift amount maintaining unit
2200 Radio communication device
2201 RF communication processing unit
2202 Digital communication processing unit
2203 First frame timing maintaining unit
2204 Second frame timing maintaining unit
2205 Shift amount recognition and inform unit

The invention claimed is:

1. A radio communication device comprising circuitry configured to place control information included in a beginning of a downlink subframe, which is transmitted from the radio communication device as a base station, in a frequency band separated from the control information of downlink subframe transmitted from an adjacent base station as synchronizing,
wherein the control information is placed in a band including a predetermined position in an event common control information which is specified to be sequentially placed from the predetermined position and addressed to all terminals in a cell of the radio communication device is included, and the control information is placed in a band which does not include the predetermined position in an event the common control information is not included.

2. The radio communication device according to claim 1, wherein the radio communication device does not include the common control information to the control information in an event the adjacent base station includes the common control information.

3. The radio communication device according to claim 1, wherein
in an event the common control information is included, the common control information is sequentially placed from the predetermined position and the control information of each terminal in the cell of the radio communication device is placed in a band separated from the adjacent base station; and
in an event the common control information is not included, the control information of each terminal in the cell of the radio communication device is placed in a band separated from the adjacent base station as skipping a region where the adjacent base station places the common control information.

4. The radio communication device according to claim 1, wherein
plural bands with different bandwidths can be selected to use; and
a band with a bandwidth larger than that of the adjacent base station is selected in an event a cell radius is larger than that of the adjacent base station, and a band with a bandwidth smaller than that of the adjacent base station is selected in an event the cell radius is smaller than that of the adjacent base station.

5. The radio communication device according to claim 4, wherein in an event the band with the bandwidth larger than that of the adjacent base station is selected, the control information of the cell of the radio communication device is placed as skipping the frequency band where the adjacent base station places the control information.

6. The radio communication device according to claim 4, wherein in an event the band with the bandwidth larger than that of the adjacent base station is selected and the common control information, which is specified to be sequentially placed from the predetermined position and addressed to all the terminals in the cell of the radio communication device, is included, the common control information is sequentially placed from the predetermined position as skipping the frequency band where the adjacent base station places the control information.

7. The radio communication device according to claim 4, wherein in an event the band with the bandwidth larger than that of the adjacent base station is selected and the common control information which is specified to be sequentially placed from the predetermined position and is addressed to all the terminals in the cell of the radio communication device, is included, the common control information is sequentially placed from the predetermined position including the frequency band where the adjacent base station places the control information.

8. The radio communication device according to claim 7, wherein in an event the band with the bandwidth smaller than that of the adjacent base station is selected, the control information for each terminal in the cell of the radio communication device is placed as skipping the region where the adjacent base station sequentially places the common control information from the predetermined position.

9. A radio communication method comprising:
a step for placing control information included in a beginning of a downlink subframe, which is transmitted from a radio communication device as a base station, in a frequency band separated from the control information of a downlink subframe transmitted by an adjacent base station as synchronizing,
wherein the control information is placed in a band including a predetermined position in an event common control information which is specified to be sequentially placed from the predetermined position and addressed to all terminals in a cell of the radio communication device is included, and the control information is placed in a band which does not include the predetermined position in an event the common control information is not included; and
a step for transmitting the downlink subframe.

10. A radio communication system comprising:
a first base station having a first cell having a first cell radius; and
a second base station having a second cell having a second cell radius smaller than the first cell radius and existing in the first cell,
wherein the first base station places control information, which is included in a beginning of a downlink subframe, in a frequency band which is separated from control information of a downlink subframe which the second base station transmits as synchronizing,
wherein the control information is placed in a band including a predetermined position in an event common control information which is specified to be sequentially placed from the predetermined position and addressed to all terminals in a cell of a radio communication device is included, and the control information is placed in a band which does not include the predetermined position in an event the common control information is not included.

* * * * *